United States Patent
Clapper et al.

(10) Patent No.: US 8,975,342 B2
(45) Date of Patent: Mar. 10, 2015

(54) BLENDS OF GRAFTED COPOLYMER AND POLYAMIDE

(75) Inventors: Jason D. Clapper, Lino Lakes, MN (US); Kevin M. Lewandowski, Inver Grove Heights, MN (US); Craig E. Hamer, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 126 days.

(21) Appl. No.: 13/885,083

(22) PCT Filed: Nov. 16, 2011

(86) PCT No.: PCT/US2011/060947
§ 371 (c)(1),
(2), (4) Date: May 13, 2013

(87) PCT Pub. No.: WO2012/082290
PCT Pub. Date: Jun. 21, 2012

(65) Prior Publication Data
US 2013/0253122 A1    Sep. 26, 2013

Related U.S. Application Data

(60) Provisional application No. 61/422,402, filed on Dec. 13, 2010.

(51) Int. Cl.
| | |
|---|---|
| C08F 8/30 | (2006.01) |
| C08F 26/06 | (2006.01) |
| C08F 20/02 | (2006.01) |
| C08F 20/62 | (2006.01) |
| C09J 151/00 | (2006.01) |
| C08G 81/02 | (2006.01) |
| C09J 177/00 | (2006.01) |
| C09J 177/06 | (2006.01) |
| C08L 77/06 | (2006.01) |
| C08L 87/00 | (2006.01) |

(52) U.S. Cl.
CPC ........... *C09J 151/003* (2013.01); *C08G 81/021* (2013.01); *C09J 177/00* (2013.01); *C09J 177/06* (2013.01); *C08L 77/06* (2013.01); *C08L 87/005* (2013.01)
USPC ............ 525/375; 525/329.7; 525/326.7; 526/258

(58) Field of Classification Search
USPC ............... 525/375, 329.7, 326.7; 526/258
See application file for complete search history.

(56) References Cited

U.S. PATENT DOCUMENTS

| | | | | |
|---|---|---|---|---|
| 3,475,388 A | * | 10/1969 | Yocum | 525/377 |
| 3,507,837 A | * | 4/1970 | Hidinger, Jr. | 528/336 |
| 4,070,354 A | * | 1/1978 | Dick et al. | 548/967 |
| 4,769,285 A | | 9/1988 | Rasmussen | |
| 5,057,366 A | | 10/1991 | Husman | |
| 5,106,993 A | * | 4/1992 | Kania | 548/967 |
| 5,115,035 A | * | 5/1992 | Shiraki et al. | 525/314 |
| 5,712,331 A | * | 1/1998 | Ryang | 523/400 |
| 5,804,610 A | | 9/1998 | Hamer | |
| 5,986,011 A | | 11/1999 | Ellis | |
| 6,734,256 B1 | | 5/2004 | Everaerts | |
| 6,753,079 B2 | | 6/2004 | Husemann | |
| 6,893,718 B2 | | 5/2005 | Melancon | |
| 7,255,920 B2 | | 8/2007 | Everaerts | |
| 7,393,901 B1 | * | 7/2008 | Filiatrault et al. | 525/222 |
| 7,807,754 B2 | | 10/2010 | Sherman | |
| 2011/0178250 A1 | | 7/2011 | Steelman | |

FOREIGN PATENT DOCUMENTS

| | | |
|---|---|---|
| DE | 836353 | 4/1952 |
| EP | 0265091 | 4/1988 |
| JP | 2000-273319 | 10/2000 |
| JP | 4294369 | 11/2004 |
| WO | WO 88/03543 | 5/1988 |
| WO | WO 00-22031 | 4/2000 |
| WO | WO 2012-005814 | 1/2012 |
| WO | WO 2012-005932 | 1/2012 |

OTHER PUBLICATIONS

Babenkova, "New Reactive Oligomers and Monomers Derived from Ethylenimine", Institute of Macromolecular Compounds, Academy of Sciences of the USSR, pp. 1715-1719. (Translated from Zhurnal Prikladnoi Khimii, Aug. 1967, vol. 40, No. 8, pp. 1783-1788.).
Bestian, "Über einige Reaktionen des Äthylen-imins", J. Lieb. Ann. Chem., 1950, vol. 566, pp. 210-244.
Cashion, "Influence of Hydrogen Bonding on the Adhesive Properties of Photo-Curable Acrylics", The Journal of Adhesion, 2009, vol. 85, No. 1, pp. 1-17.
Dufils, "Intermolecular Radical Addition of Alkoxyamines onto Olefins: An Easy Access to Advanced Macromolecular Architectures Precursors", Polymer, 2007, vol. 48, pp. 5219-5225.
Kadorkina, "α,ω-Bis-N-Aziridinoalkanes", Bulletin of the Academy of Sciences of the USSR, Apr. 1991, vol. 40, pp. 780-783. [N. N. Semenov Institute of Chemical Physics, Academy of Sciences of the USSR, Moscow. Translated from Izvestiya Akademii Nauk SSSR, Seriya Khimicheskaya, No. 4, pp. 882-885, Apr. 1991. Original article submitted May 25, 1990 (4 pages).].
Kobayashi, "Synthesis of Well-Defined Polymers End-Functionalized with Crosslinkable Aziridine Groups by Living Anionic Polymerization", Journal of Polymer Science: Part A: Polymer Chemistry, 2005, vol. 43, pp. 4126-4135.
Leenen, "Microwave-Assisted Nitroxide-Mediated Polymerization of Alkyl Acrylates", e-Polymers, 2005, No. 71, pp. 1-9.
International Search Report for PCT/US2011/060947, 4 pages.

* cited by examiner

*Primary Examiner* — Kara Boyle
(74) *Attorney, Agent, or Firm* — Jean A. Lown

(57) ABSTRACT

Compositions are described that are blends of a grafted copolymer and a polyamide. Methods of making the blended compositions are also described. The grafted copolymers are the reaction product of (1) a first compound having both an aziridinyl group and a polymeric group with (2) a second polymeric material having an acidic group. Blending the grafted copolymer with the polyamide can be used, for example, to increase the cohesive strength of the grafted copolymer.

20 Claims, No Drawings

BLENDS OF GRAFTED COPOLYMER AND POLYAMIDE

CROSS REFERENCE TO RELATED APPLICATION

This application claims the benefit of U.S. Provisional Patent Application No. 61/422,402, filed Dec. 13, 2010, the disclosure of which is incorporated by reference herein in its entirety.

TECHNICAL FIELD

Blends of a grafted copolymer and a polyamide as well as methods of making the blends are described.

BACKGROUND

Different methods have been used to reinforce various polymers such as acrylic polymers. For example, crosslinking can impart greater shear strength and cohesive strength to the polymers. This crosslinking can be chemical or physical. Chemical crosslinking can include the introduction of a monomer having at least two groups selected from a polymerizable group capable of undergoing a polymerization reaction and a functional group capable of reacting or interacting with other groups within the polymer. Physical crosslinking methods have included the introduction of another polymeric moiety that is linked to the primary polymer but has the ability to phase separate from the primary polymer and form its own domain within the polymeric material. When the polymeric material is an adhesive material, the phase separated polymeric moiety can be selected to have a higher glass transition temperature than the primary viscoelastic polymer as described, for example, in U.S. Pat. No. 6,734,256 (Everaerts et al.), U.S. Pat. No. 7,255,920 (Everaerts et al.), and U.S. Pat. No. 5,057,366 (Husman et al.).

Bis-aziridine compounds have been used as chemical crosslinking agents in various polymer systems. Such compounds are described, for example, in U.S. Pat. No. 6,893,718 (Melancon et al.), German Patent No. 836,353 (Bestian), in an article of Bestian (*J. Lieb. Ann. Chem.*, 566, 210-244 (1950)), in an article of Babenkova (*J. of Applied Chemistry of the USSR*, 40, 1715-1719 (1967)), and in an article of Kadorkina et al. (*Bulletin of the Academy of Sciences of the USSR*, 40, 780-783 (1991)).

Some aziridinyl-terminated polymers have been prepared as described, for example, in an article of Kobayashi et al. (*Journal of Polymer Science: Part A: Polymer Chemistry*, 43, 4126-4135 (2005)), Japanese Patent Publication JP4294369B2 (Kobayashi et al.), and European Patent Publication EP0265091A1 (Heftier et al.).

Blends of polyacrylates and polyamides have been described, for example, in U.S. Pat. No. 4,769,285 (Rasmussen) to prepare pressure-sensitive adhesives.

SUMMARY

Compositions are described that are blends of a grafted copolymer and a polyamide. Methods of making the compositions are also described. The grafted copolymers are the reaction product of (1) a first compound having both an aziridinyl group and a first polymeric group with (2) a second polymeric material having an acidic group. Blending the grafted copolymer with the polyamide can be used, for example, to increase the cohesive strength of the grafted copolymer.

In a first aspect, a composition is described that is a blended composition that includes a) a grafted copolymer and b) a polyamide. The grafted copolymer contains a product of a reaction mixture that includes 1) a first compound of Formula (I)

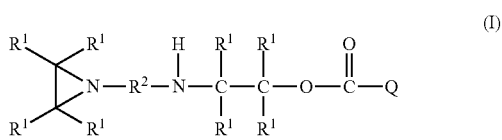

and 2) a second polymeric material having at least one acidic group. In Formula (I), each $R^1$ is independently hydrogen or an alkyl. Group $R^2$ is a divalent group containing an alkylene, heteroalkylene, arylene, heteroarylene, or a combination thereof and optionally further containing an oxy, carbonyl, carbonyloxy, carbonylimino, —$NR^3$—, or a combination thereof. Group $R^3$ is hydrogen or an alkyl. Group Q is a first polymeric group that includes a polymerized product of a first monomer composition containing at least one ethylenically unsaturated monomer. The polyamide included in the blended composition is selected 1) to have a melting temperature no greater than 200° C., 2) to be at least partially soluble in the composition at blending temperature, or 3) both 1) and 2).

In a second aspect, a method of preparing a composition is described. The method includes providing a grafted copolymer comprising a product of a reaction mixture comprising 1) a first compound of Formula (I) as described above and 2) a second polymeric material having at least one acidic group. The method further includes forming a composition that includes the grafted copolymer with a polyamide. The polyamide included in the composition is selected (1) to have a melting temperature no greater than 200° C., (2) to be at least partially soluble in the composition at blending temperature, or (3) both (1) and (2).

DETAILED DESCRIPTION

Compositions are described that include a grafted copolymer blended with a polyamide. The grafted copolymers are prepared by reacting (1) a first compound having both an aziridinyl group and a first polymeric group with (2) a second polymeric material having at least one acidic group. This reaction results in the opening of the aziridinyl ring on the first compound by the acidic group on the second polymeric material and the formation of an attachment group that connects (i.e., grafts) the first polymeric group of the first compound to the second polymeric material. The cohesive strength of the composition is typically higher than the cohesive strength of either the grafted copolymer or the second polymeric material used to form the grafted copolymer.

The term "a", "an", and "the" are used interchangeably with "at least one" to mean one or more of the elements being described.

The recitation of any numerical range by endpoints is meant to include the endpoints of the range, all numbers within the range, and any narrower range within the stated range.

The term "aziridinyl" refers to a monovalent three-member ring structure of formula

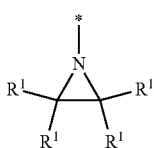

where each $R^1$ is independently hydrogen or an alkyl (e.g., an alkyl having 1 to 10 carbon atoms, 1 to 6 carbon atoms, or 1 to 3 carbon atoms). The asterisk shows the location where the aziridinyl group is attached to the rest of the compound.

The term "alkyl" refers to a monovalent group that is a radical of an alkane and includes groups that are linear, branched, cyclic, bicyclic, or a combination thereof. The alkyl group typically has 1 to 30 carbon atoms. In some embodiments, the alkyl group contains 1 to 20 carbon atoms, 1 to 10 carbon atoms, 1 to 6 carbon atoms, 1 to 4 carbon atoms, or 1 to 3 carbon atoms. Examples of alkyl groups include, but are not limited to, methyl, ethyl, n-propyl, iso-propyl, n-butyl, isobutyl, tert-butyl, n-pentyl, n-hexyl, cyclohexyl, n-heptyl, n-octyl, ethylhexyl, and isobornyl.

The term "alkylene" refers to a divalent group that is a radical of an alkane. The alkylene can be straight-chained, branched, cyclic, bicyclic, or a combination thereof. The alkylene typically has 1 to 30 carbon atoms. In some embodiments, the alkylene contains 1 to 20, 1 to 10, 1 to 6, or 1 to 4 carbon atoms. The radical centers of the alkylene can be on the same carbon atom (i.e., an alkylidene) or on different carbon atoms.

The term "alkoxy" refers to a monovalent group of formula —OR where R is an alkyl group.

The term "amido" refers to a group of formula —(CO)NH—.

The term "aryl" refers to a monovalent group that is aromatic and carbocyclic. The aryl can have one to five rings that are connected to or fused to the aromatic ring. At least one ring is aromatic and any other ring can be aromatic, non-aromatic, or a combination thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "arylene" refers to a divalent group that is carbocyclic and aromatic. The group has one to five rings that are connected, fused, or a combination thereof. At least one ring is aromatic and any other ring can be aromatic, non-aromatic, or a combination thereof. In some embodiments, the arylene group has up to 5 rings, up to 4 rings, up to 3 rings, up to 2 rings, or one aromatic ring. For example, the arylene group can be phenylene, biphenylene, terphenylene, fluorenylene, or naphthalene.

The term "aralkyl" refers to a monovalent group that is an alkyl group substituted with an aryl group.

The term "aryloxy" refers to a monovalent group of formula —OAr where Ar is an ayrl group.

The term "aryloxyalkyl" refers to a monovalent group that is an alkyl substituted with an aryloxy group.

The term "carbonyl" refers to a divalent group of formula —(CO)— where the carbon is attached to the oxygen with a double bond.

The term "carbonyloxy" are used interchangeably to refer to a divalent group of formula —(CO)O.

The term "carboxyl" refers to the group —(CO)OH and/or the salt thereof.

The term "carbonylimino" refers to a divalent group of formula —(CO)NR$^b$— where R$^b$ is hydrogen, alkyl, aryl, aralkyl, acyl, alkylsulfonyl, or arylsulfonyl.

The term "heteroalkyl" refers to a monovalent group that is an alkyl group in which one or more —CH$_2$— groups are replaced with thio, oxy, or —NR$^a$— where R$^a$ is hydrogen or alkyl. The heteroalkyl can be linear, branched, cyclic, bicyclic, or a combination thereof and can include up to 60 carbon atoms and up to 40 heteroatoms. In some embodiments, the heteroalkyl group includes up to 50 carbon atoms and up to 30 heteroatoms, up to 40 carbon atoms and up to 30 heteroatoms, up to 30 carbon atoms and up to 20 heteroatoms, up to 20 carbon atoms and up to 15 heteroatoms, or up to 10 carbon atoms and up to 8 heteroatoms.

The term "heteroalkylene" refers to a divalent alkylene having one or more —CH$_2$— groups replaced with a thio, oxy, or —NR$^a$— where R$^a$ is hydrogen or alkyl. The heteroalkylene can be linear, branched, cyclic, bicyclic, or a combination thereof and can include up to 60 carbon atoms and up to 40 heteroatoms. In some embodiments, the heteroalkylene includes up to 50 carbon atoms and up to 30 heteroatoms, up to 40 carbon atoms and up to 30 heteroatoms, up to 30 carbon atoms and up to 20 heteroatoms, up to 20 carbon atoms and up to 15 heteroatoms, or up to 10 carbon atoms and up to 8 heteroatoms.

The term "heteroarylene" refers to a divalent group that is aromatic and heterocyclic. That is, the heteroarylene includes at least one heteroatom in an aromatic ring having 5 or 6 members. Suitable heteroatoms are typically oxy, thio, or —NR$^3$— where R$^3$ is hydrogen or an alkyl. The group can have one to five rings that are connected, fused, or a combination thereof. At least one ring is heteroaromatic and any other ring can be aromatic, non-aromatic, heterocyclic, carbocyclic, or a combination thereof. In some embodiments, the heteroarylene has up to 5 rings, up to 4 rings, up to 3 rings, up to 2 rings, or one ring. Examples of heteroarylene groups include, but are not limited to, triazine-diyl, pyridine-diyl, pyrimidine-diyl, pyridazine-diyl, and the like.

The term "(meth)acrylic acid" refers to both acrylic acid and methacrylic acid. Likewise, the term "(meth)acrylate" refers to both an acrylate (i.e., acrylate ester) and a methacrylate (i.e., methacrylate ester) and the term "(meth)acrylamide" refers to both an acrylamide and a methacrylamide.

The term "oxy" refers to a divalent group —O—.

The term "polyamide" refers to a polymer having multiple amido groups of formula —(CO)NH—.

The term "blending temperature" refers to the temperature used to blend the grafted copolymer and the polyamide. The blending temperature is often in a range of ambient temperature up to 300° C., ambient temperature up to 250° C., or ambient temperature up to 200° C.

As used herein, the terms "polymer" or "polymeric" refers to a material that is a homopolymer, copolymer, terpolymer, or the like. Likewise, the terms "polymerize" or "polymerization" refers to a process of making a homopolymer, copolymer, terpolymer, or the like. The terms "copolymer" or "copolymeric" can be used to refer to a polymer prepared using two or more different monomers.

The grafted copolymers included in the blend are formed from a reaction mixture that includes a first compound of Formula (I)

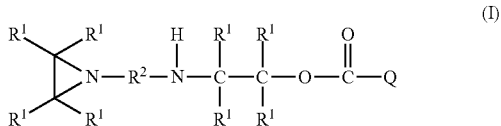

plus a second polymeric material having at least one acid group. In Formula (I), each $R^1$ is independently hydrogen or an alkyl. The $R^2$ group is a divalent group containing an alkylene, heteroalkylene, arylene, heteroarylene, or a combination thereof. Group $R^2$ can optionally further include an oxy, carbonyl, carbonyloxy, carbonylimino, —$NR^3$—, or a combination thereof. Group $R^3$ is hydrogen or an alkyl (e.g., an alkyl having 1 to 10 carbon atoms, 1 to 6 carbon atoms, 1 to 4 carbon atoms, or 1 to 3 carbon atoms). Group Q is a first polymeric group that is a polymerized product of a first monomer composition that includes at least one ethylenically unsaturated monomer.

Suitable alkyl groups for $R^1$ typically have 1 to 10 carbon atoms, 1 to 6 carbon atoms, 1 to 4 carbon atoms, or 1 to 3 carbon atoms. In many embodiments, the azirdinyl group has at least one $R^1$ group that is hydrogen and at least one $R^1$ group that is an alkyl. In some more specific embodiments, one of the $R^1$ groups on the azridinyl ring is methyl with the remaining $R^1$ groups being hydrogen.

The divalent group $R^2$ contains at least one alkylene, heteroalkylene, arylene, heteroarylene, or a combination thereof. In addition to at least one of these groups, $R^2$ can further include an oxy, carbonyl, carbonyloxy, carbonylimino, —$NR^3$—, or a combination thereof. That is, in some embodiments, $R^2$ is an alkylene, a heteroalkylene, an arylene, a heteroarylene, or a combination thereof. In other embodiments, $R^2$ includes (a) at least one alkylene, heteroalkylene, arylene, heteroarylene, or a combination thereof plus (b) at least one oxy, carbonyl, carbonyloxy, carbonylimino, —$NR^3$—, or a combination thereof. The oxy, carbonyl, carbonyloxy, carbonylimino, —$NR^3$— or a combination thereof can be used, for example, (1) to link together two or more groups selected from alkylene, heteroalkylene, arylene, and heteroarylene, (2) to attach an alkylene, heteroalkylene, arylene, or heteroarylene to the aziridinyl group, to the group —NH—$C(R^1)_2$—$C(R^1)_2$—O—(CO)-Q, or to both the aziridinyl group and the group —NH—$C(R^1)_2$—$C(R^1)_2$—O—(CO)-Q, or (3) a combination thereof (i.e., both (1) and (2)).

In some embodiments, $R^2$ includes a first group that is an alkylene, heteroalkylene, arylene, heteroarylene, or combination thereof connected to a second group that is an alkylene, heteroalkylene, arylene, heteroarylene, or combination thereof using a first linking group that is an oxy, carbonyl, carbonyloxy, carbonylimino, —$NR^3$—, or a combination thereof. The second group can be further connected to a third group that is an alkylene, heteroalkylene, arylene, heteroarylene, or combination thereof using a second linking group that is an oxy, carbonyl, carbonyloxy, carbonylimino, —$NR^3$—, or combination thereof. The third group can be further connected to a fourth group that is an alkylene, heteroalkylene, arylene, heteroarylene, or combination thereof using a third linking group that is an oxy, carbonyl, carbonyloxy, carbonylimino, —$NR^3$—, or a combination thereof. Additional groups selected from an alkylene, heteroalkylene, arylene, heteroarylene, or combination thereof can be further connected using additional linking groups selected from an oxy, carbonyl, carbonyloxy, carbonylimino, —$NR^3$—, or a combination thereof.

In other embodiments, $R^2$ includes a first group that is an alkylene, heteroalkylene, arylene, or heteroarylene that is positioned between two linking groups that are each an oxy, carbonyl, carbonyloxy, carbonylimino, —$NR^3$—, or a combination thereof. One of these linking groups is attached to the aziridinyl group and the other is attached to the group —NH—$C(R^1)_2$—$C(R^1)_2$—O—(CO)-Q. These two linking groups are typically the same but can be different.

In still other embodiments, two or more alkylene, heteroalkylene, arylene, or heteroarylene groups are positioned between two linking groups that are each an oxy, carbonyl, carbonyloxy, carbonylimino, —$NR^3$—, or a combination thereof. One of these linking groups is attached the group —NH—$C(R^1)_2$—$C(R^1)_2$—O—(CO)-Q and the other is attached to the aziridinyl group. These two linking groups are typically the same but can be different. The two or more alkylene, heteroalkylene, arylene, heteroarylene, or combination thereof are typically connected to each other through an additional linking group that is an oxy, carbonyl, carbonyloxy, carbonylimino, —$NR^3$— group, or a combination thereof.

Some compounds of Formula (I) are also compounds of Formula (Ia).

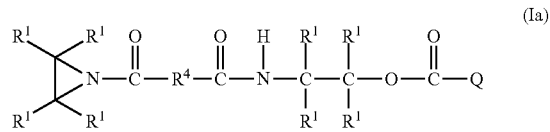

The group $R^2$ from Formula (I) is equal to —(CO)—$R^4$—(CO)— in Formula (Ia). Group $R^4$ is a divalent group that includes an alkylene, heteroalkylene, arylene, heteroarylene, or a combination thereof. Optionally, group $R^4$ can further include an oxy, carbonyl, carbonyloxy, carbonylimino, —$NR^3$—, or a combination thereof. Stated differently, in some embodiments, $R^4$ is an alkylene, a heteroalkylene, an arylene, a heteroarylene, or a combination thereof. In other embodiments, $R^4$ includes (a) at least one alkylene, heteroalkylene, arylene, heteroarylene, or a combination thereof plus (b) at least one oxy, carbonyl, carbonyloxy, carbonylimino, —$NR^3$—, or a combination thereof.

As with the $R^2$ group in Formula (I), the $R^4$ group in Formula (Ia) can include a first group that is an alkylene, heteroalkylene, arylene, heteroarylene, or combination thereof connected to a second group that is an alkylene, heteroalkylene, arylene, heteroarylene, or combination thereof using a first linking group that is an oxy, carbonyl, carbonyloxy, carbonylimino, —$NR^3$—, or a combination thereof. The second group can be further connected to a third group that is an alkylene, heteroalkylene, arylene, heteroarylene, or combination thereof using a second linking group that is an oxy, carbonyl, carbonyloxy, carbonylimino, —$NR^3$—, or combination thereof. The third group can be further connected to a fourth group that is an alkylene, heteroalkylene, arylene, heteroarylene, or combination thereof using a third linking group that is an oxy, carbonyl, carbonyloxy, carbonylimino, —$NR^3$—, or a combination thereof. Additional groups selected from an alkylene, heteroalkylene, arylene, heteroarylene, or combination thereof can be further connected using additional linking groups selected from an oxy, carbonyl, carbonyloxy, carbonylimino, —$NR^3$—, or a combination thereof.

In some more specific compounds of Formula (Ib), the arylene is phenylene such as meta-phenylene in Formula (Ic) or para-phenylene as in Formula (Id).

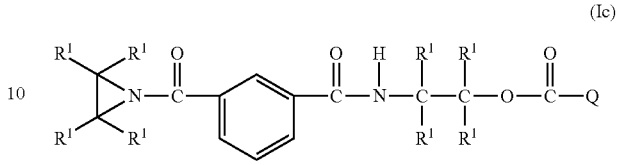

(Ic)

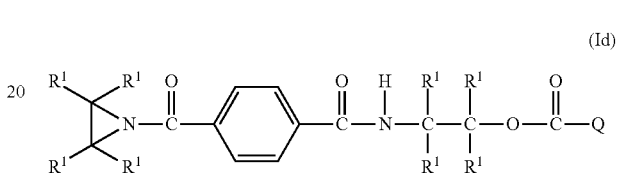

(Id)

Other example compounds of Formula (Ia) are of Formula (Ie).

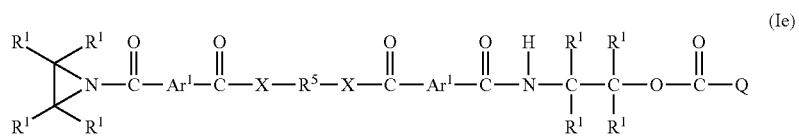

(Ie)

In some embodiments, the group $R^4$ in Formula (Ia) is an alkylene, heteroalkylene, arylene, heteroarylene, or combination thereof. Exemplary alkylene groups have 1 to 30 carbon atoms, 1 to 20 carbon atoms, 1 to 12 carbon atoms, 1 to 6 carbon atoms, or 1 to 4 carbon atoms. Exemplary heteroalkylene groups have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms. Exemplary arylene groups include, but are not limited to, phenylene (e.g., meta-phenylene or para-phenylene) and biphenylene. Exemplary heteroarylenes include, but are not limited to, triazine-diyl, pyridine-diyl, pyrimidine-diyl, and pyridazine-diyl.

Some more specific compounds according to Formula (Ia) are of Formula (Ib) where $R^4$ is an arylene.

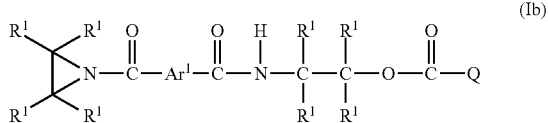

(Ib)

In Formula (Ie), the divalent group —$Ar^1$—(CO)—X—$R^5$—X—(CO)—$Ar^1$— is equal to $R^4$ in Formula (Ia) and the divalent group —(CO)—$Ar^1$—(CO)—X—$R^5$—X—(CO)—$Ar^1$—(CO)— is equal to $R^2$ in Formula (I). Each group $Ar^1$ is an arylene and each group X is oxy or —$NR^3$—. Group $R^5$ is a divalent group that includes an alkylene, heteroalkylene, arylene, heteroarylene, or a combination thereof and that can further include an oxy, carbonyl, carbonyloxy, carbonylimino, —$NR^3$—, or a combination thereof. Stated differently, in some embodiments, $R^5$ is an alkylene, a heteroalkylene, an arylene, a heteroarylene, or a combination thereof. In other embodiments, $R^5$ includes (a) at least one alkylene, heteroalkylene, arylene, heteroarylene, or a combination thereof plus (b) at least one oxy, carbonyl, carbonyloxy, carbonylimino, —$NR^3$—, or a combination thereof.

As with both $R^2$ and $R^4$, group $R^5$ can include a first group that is an alkylene, heteroalkylene, arylene, heteroarylene, or combination thereof connected to a second group that is an alkylene, heteroalkylene, arylene, heteroarylene, or combination thereof using a first linking group that is an oxy, carbonyl, carbonyloxy, carbonylimino, —$NR^3$—, or a combination thereof. The second group can be further connected to a third group that is an alkylene, heteroalkylene, arylene, heteroarylene, or combination thereof using a second linking group that is an oxy, carbonyl, carbonyloxy, carbonylimino, —NR³—, or combination thereof. The third group can be further connected to a fourth group that is an alkylene, heteroalkylene, arylene, heteroarylene, or combination thereof using a third linking group that is an oxy, carbonyl, carbonyloxy, carbonylimino, —NR³—, or a combination thereof. Additional groups selected from an alkylene, heteroalkylene, arylene, heteroarylene, or combination thereof can be further connected using additional linking groups selected from an oxy, carbonyl, carbonyloxy, carbonylimino, —NR³—, or a combination thereof.

In some compounds of Formula (Ie), each Ar¹ is phenylene such as in Formula (If).

independently an alkylene having 1 to 10 carbon atoms, 1 to 6 carbon atoms, 1 to 4 carbon atoms, or 1 to 3 carbon atoms. Group R⁷ is a divalent group that includes an alkylene, heteroalkylene, arylene, heteroarylene, or a combination thereof and that can further include an oxy, carbonyl, carbonyloxy, carbonylimino, —NR³—, or a combination thereof. Stated differently, in some embodiments, R⁷ is an alkylene, a heteroalkylene, an arylene, a heteroarylene, or a combination thereof. In other embodiments, R⁷ includes (a) at least one alkylene, heteroalkylene, arylene, heteroarylene, or a combination thereof plus (b) at least one oxy, carbonyl, carbonyloxy, carbonylimino, —NR³—, or a combination thereof.

As with R², R⁴, or R⁵, group R⁷ can include a first group that is an alkylene, heteroalkylene, arylene, heteroarylene, or

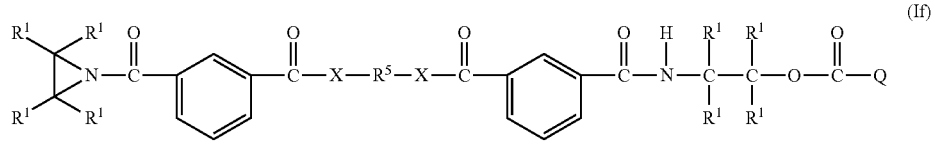

(If)

The groups R¹, X, R⁵, and Q are the same as defined above for Formula (Id). As shown in Formula (If), the phenylene groups are connected to the rest of the compound at the meta positions. As shown in Formula (If), Ar¹ is meta-phenylene. Alternatively, Ar¹ can be para-phenylene.

In some specific embodiments of Formula (If), the group R⁵ is an alkylene or heteroalkylene group. Suitable alkylene groups often have 1 to 30 carbon atoms, 1 to 20 carbon atoms, 1 to 12 carbon atoms, 1 to 10 carbon atoms, 1 to 6 carbon atoms, or 1 to 4 carbon atoms. Suitable heteroalkylene groups often have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms.

Other example compounds of Formula (Ia) are of (Ig).

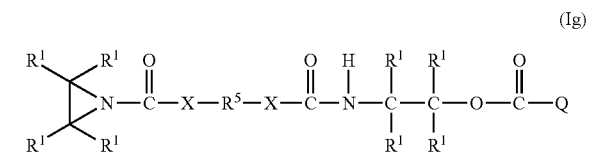

(Ig)

In Formula (Ig), the group —X—R⁵—X— is equal to R⁴ in Formula (Ia) and the group —(CO)—X—R⁵—X—(CO)— is equal to R² in Formula (I). The groups X and R⁵ are the same as defined above for Formula (Ie). In some specific embodiments of Formula (Ig), each X is oxy or —NR³— with the group R⁵ being an alkylene or heteroalkylene.

Yet other example compounds of Formula (I) are of Formula (Ih).

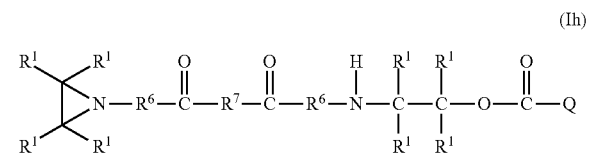

(Ih)

In Formula (Ih), the divalent group —R⁶—(CO)—R⁷—(CO)—R⁶— is equal to group R² in Formula (I). Each R⁶ is combination thereof connected to a second group that is an alkylene, heteroalkylene, arylene, heteroarylene, or combination thereof using a first linking group that is an oxy, carbonyl, carbonyloxy, carbonylimino, —NR³—, or a combination thereof. The second group can be further connected to a third group that is an alkylene, heteroalkylene, arylene, heteroarylene, or combination thereof using a second linking group that is an oxy, carbonyl, carbonyloxy, carbonylimino, —NR³—, or combination thereof. The third group can be further connected to a fourth group that is an alkylene, heteroalkylene, arylene, heteroarylene, or combination thereof using a third linking group that is an oxy, carbonyl, carbonyloxy, carbonylimino, —NR³—, or a combination thereof. Additional groups selected from an alkylene, heteroalkylene, arylene, heteroarylene, or combination thereof can be further connected using additional linking groups selected from an oxy, carbonyl, carbonyloxy, carbonylimino, —NR³—, or a combination thereof.

Some compounds of Formula (Ih) are compounds of Formula (Ii).

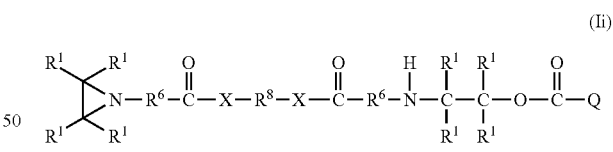

(Ii)

In Formula (Ii), the divalent group —X—R⁸—X— is equal to the group R⁷ in Formula (Ih). Each group X is independently oxy or —NR³—. Group R⁸ is a divalent group that includes an alkylene, heteroalkylene, arylene, heteroarylene, or a combination thereof and that can further include an oxy, carbonyl, carbonyloxy, carbonylimino, —NR³—, or a combination thereof. Stated differently, in some embodiments, R⁸ is an alkylene, heteroalkylene, arylene, heteroarylene, or a combination thereof. In other embodiments, R⁸ includes (a) at least one alkylene, heteroalkylene, arylene, heteroarylene, or a combination thereof plus (b) at least one oxy, carbonyl, carbonyloxy, carbonylimino, —NR³—, or a combination thereof.

Group R⁸ is an alkylene or heteroalkylene group and X is an oxy in some specific embodiments of Formula (Ii). Suitable alkylene groups often have 1 to 30 carbon atoms, 1 to 20 carbon atoms, 1 to 12 carbon atoms, 1 to 10 carbon atoms, 1 to 6 carbon atoms, or 1 to 4 carbon atoms. Suitable heteroalkylene groups often have 2 to 60 carbon atoms and 1 to 40 heteroatoms, 2 to 40 carbon atoms and 1 to 30 heteroatoms, 2 to 20 carbon atoms and 1 to 15 heteroatoms, or 2 to 10 carbon atoms and 1 to 6 heteroatoms.

All of the compounds of Formula (I) and (Ia) to (Ii) have a group Q, which is a first polymeric group that is a polymerized product of a first monomer composition that includes at least one ethylenically unsaturated monomer. Although the polymerization reaction can be either a free radical polymerization reaction or an anionic polymerization reaction, free radical polymerization reactions are often used.

Any suitable ethylenically unsaturated monomer can be used to form polymeric group Q (i.e., first polymeric group Q). Suitable monomers include, but are not limited to, various (meth)acrylates (i.e., various (meth)acrylate esters), (meth) acrylic acids, (meth)acrylamides, vinyl compounds, or the like. In some embodiments, Q is a homopolymeric group in which all of the monomers used to form the polymeric group are the same. In other embodiments, Q is a random copolymer or a block copolymer.

In some embodiments, the polymeric group Q for the first compound of Formula (I) is formed from one or more (meth) acrylates. The (meth)acrylates are often In Formula (II).

(II)

In this formula, group $R^{10}$ is hydrogen or methyl and group $R^9$ is an alkyl, heteroalkyl, aryl, aralkyl, or aryloxyalkyl. Suitable alkyl groups often have 1 to 20 carbon atoms, 1 to 10 carbon atoms, 1 to 6 carbon atoms, or 1 to 4 carbon atoms. Suitable heteroalkyl groups often have 2 to 30 carbon atoms and 1 to 16 heteroatoms, 2 to 20 carbon atoms and 1 to 12 carbon atoms, 2 to 10 carbon atoms and 1 to 6 heteroatoms, or 2 to 6 carbon atoms and 1 to 4 heteroatoms. The alkyl and heteroalkyl groups can be linear, branched, cyclic, bicyclic, or a combination thereof. Suitable aralkyl groups often have 7 to 18 carbon atoms. An example is an alkyl group substituted with phenyl. Suitable aryloxyalkyl groups often have 7 to 18 carbon atoms. An example is an alkyl group substituted with an oxyphenyl. These monomers, when formed into a homopolymer, can have a wide range of glass transition temperatures.

The monomers can be selected that provide a desired glass transition temperature depending on a particular use of the compound of Formula (I). More specifically, polymeric Q groups having a glass transition temperature greater than or equal to 20° C. tend to be thermoplastic. As used herein, the term "thermoplastic" refers to a polymeric material that flows when heated and then return to its original state when cooled to room temperature. The polymeric groups with a glass transition temperature that is less than 20° C. tend to be rubbery. As used herein, the term "rubbery" refers to a polymeric material that can be stretched to at least twice its original length and then retracted to approximately its original length upon release.

In some embodiments, the monomers of Formula (II) used to form the polymeric group Q are selected from (meth) acrylates such as n-butyl acrylate, decyl acrylate, 2-ethoxy ethyl acrylate, 2-ethoxy ethyl methacrylate, isoamyl acrylate, n-hexyl acrylate, n-hexyl methacrylate, isobutyl acrylate, isodecyl acrylate, isodecyl methacrylate, isononyl acrylate, 2-ethylhexyl acrylate, 2-ethylhexyl methacrylate, isooctyl acrylate, isooctyl methacrylate, isotridecyl acrylate, lauryl acrylate, lauryl methacrylate, 2-methoxy ethyl acrylate, 2-methylbutyl acrylate, 4-methyl-2-pentyl acrylate, n-octyl acrylate, n-propyl acrylate, and n-octyl methacrylate. These monomers, when formed into a homopolymeric group, tend to have a glass transition temperature less than 20° C., less than 10° C., or less than 0° C.

In other embodiments, the monomers of Formula (II) used to form the polymeric group Q are selected from (meth) acrylates (i.e., (meth)acrylate esters) such as methyl methacrylate, ethyl methacrylate, isopropyl methacrylate, isobutyl methacrylate, tert-butyl methacrylate, tert-butyl acrylate, cyclohexyl methacrylate, phenoxyethyl acrylate, phenoxyethyl methacrylate, isobornyl methacrylate, isobornyl acrylate, phenyl methacrylate, benzyl methacrylate, nonylphenol methacrylate, cetyl acrylate, dicyclopentenyl(meth)acrylate, isobornylcyclohexyl acrylate, tetrahydrofurfuryl methacrylate, trifluoroethyl methacrylate, 1-adamantyl methacrylate, dicyclopentenyloxyethyl(meth)acrylate, dicyclopentanyl (meth)acrylate, and 3,3,5 trimethylcyclohexyl(meth)acrylate. These monomers, when formed into a homopolymeric group, tend to have a glass transition temperature that is equal to at least 20° C., at least 30° C., at least 40° C., or at least 50° C.

Any of the (meth)acrylate monomers can be optionally substituted with a group such as an amino group, hydroxyl group, or epoxy group. The substituents tend to enhance the polarity of the monomers. Examples of (meth)acrylates with an amino group include, but are not limited to, N,N-dialkyl (meth)acrylates such as dimethylaminoethyl(meth)acrylate. Examples of (meth)acrylates with a hydroxyl substituent include, but are not limited to, 2-hydroxyethyl(meth)acrylate, 2-hydroxypropyl(meth)acrylate, and 4-hydroxylbutyl(meth) acrylate. Examples (meth)acrylates with an epoxy substituent include, but are not limited to, glycidyl(meth)acrylate.

The (meth)acrylates can also be an alkoxyalkyl(meth)acrylate or poly(alkoxyalkyl(meth)acrylate) such as, for example, 2-(2-ethoxyethoxy)ethyl(meth)acrylate, 2-ethoxyethyl (meth)acrylate, 2-methoxyethoxyethyl(meth)acrylate, 2-methoxyethyl(meth)acrylate, and polyethylene glycol mono(meth)acrylates. These monomers tend to be polar molecules.

The polymeric group Q is typically prepared from non-acidic monomers. If group Q is prepared from a mixture of monomers, at least 90 weight percent, at least 95 weight percent, at least 97 weight percent, at least 98 weight percent, or at least 99 weight percent of the monomers do not have an acidic group (i.e., the monomers are free of acidic groups) such as a carboxyl group. In some embodiments, all of the monomers in the first monomer composition are free of acidic groups or substantially free of acidic groups (e.g., less then 1 weight percent, less than 0.5 weight percent, less than 0.2 weight percent, less then 0.1 weight percent, less than 0.05 weight percent, or less than 0.01 weight percent of the monomers are acidic monomers). If the content of acidic monomers used to form polymeric group Q is too great, it can be difficult to prepare a compound of Formula (I) with a single aziridinyl group.

Some specific Q groups are prepared from (meth)acrylates such as, for example, poly(benzyl methacrylate), poly(methyl methacrylate), poly(phenoxyethyl acrylate), and random or block poly(isobornyl acrylate-co-benzyl methacrylate).

Other suitable ethylenically unsaturated monomers for forming polymeric group Q are (meth)acrylamide, alkyl acrylamides such as tert-butyl acrylamide, monoalkylaminoalkyl acrylamides such as methylaminoethyl acrylamide, dialkylaminoalkylacrylamides such as dimethylaminoethylacrylamide, and the like.

Still other suitable ethylenically unsaturated monomers that can be used to form polymeric group Q are various vinyl monomers such as, vinyl ether monomers, vinyl aryl monomers, vinyl heterocyclic monomers, vinyl ester monomers, and the like. Suitable vinyl ether monomers include, for example, vinyl methyl ether. Suitable vinyl aryl monomers include, but are not limited to, styrene, alpha-methyl styrene, alkyl substituted sytrenes (e.g., vinyl toluene, dimethylstytrene, ethylstyrene, isopropylstyrene, and tert-butylstyrene), and the like. Any of these vinyl aryl monomers optionally can be substituted with one or more groups selected from amino, hydroxyl, alkoxy, halo, and the like. Suitable vinyl heterocyclic monomers include, but are not limited to, 2-vinyl pyridine, 4-vinyl pyridine, and n-vinyl caprolactam. Suitable vinyl esters include, but are not limited to, vinyl acetate and vinyl proprionate. Monomers such as vinyl aryl monomers, vinyl heterocyclic monomers, and some vinyl ester monomers, when formed into a homopolymeric group, tend to have a glass transition temperature that is at least 20° C., at least 30° C., at least 40° C., or at least 50° C.

Some specific Q polymeric groups are prepared from vinyl monomers such as a vinyl aryl monomer, vinyl heterocyclic monomer, or a combination thereof. These Q groups can be homopolymers, random copolymers, or block copolymers. The block copolymers can have two or more blocks. Some block copolymers have a first block of poly(vinyl aryl monomer) and a second block of poly(vinyl heterocyclic monomer). Some specific polymeric examples are poly(styrene), random poly(styrene-co-vinyl pyridine), and di-block poly(styrene-co-vinyl pyridine).

The polymeric group Q can have any suitable molecular weight. In many embodiments, the weight average molecular weight (Mw) is greater than the 5,000 grams/mole (i.e., 5,000 Daltons). For example, the weight average molecular weight can be greater than 7,500 grams/mole, greater than 10,000 grams/mole, greater than 12,000 grams/mole, greater than 15,000 grams/mole, or greater than 20,000 grams/mole. The weight average molecular weight is often up to 150,000 grams/mole, up to 120,000 grams/mole, up to 100,000 grams/mole, up to 80,000 grams/mole, up to 60,000 grams/mole, or up to 40,000 grams/mole. If the molecular weight is too great, the resulting compound of Formula (I) can have an unacceptably low concentration of the aziridinyl group based on the weight of the first compound. That is, the weight percent of the compound attributable to the aziridinyl group may be unacceptably low compared to the weight percent of the first compound attributable to the polymeric group.

Although the polymeric group Q can be formed by either anionic polymerization or free radical polymerization, free radical polymerization techniques are often used. The polymerization reaction typically occurs in the presence of an initiator. Although any known initiator can be used, the initiator is often an azo compound. Suitable azo compounds include, but are not limited to, 2,2'-azobis(isobutyronitrile) commercially available under the trade designation VAZO 64 from DuPont (Wilmington, Del.), 2,2'-azobis(2-methylbutyronitrile) commercially available under the trade designation VAZO 67 from DuPont, 2,2'-azobis(2,4-dimethylpentanenitrile) commercially available under the trade designation VAZO 52 from DuPont, and 4,4'-azobis(4-cyanovaleric acid). The use of a carboxyl-containing initiator such as 4,4'-azobis(4-cyanovaleric acid) is often preferred because such an initiator tends to increase the likelihood that the polymeric intermediate (Q-(CO)—OH) involved in the preparation of the compounds of Formula (I) has a carboxyl group. The initiator is typically added in an amount in the range of 0.01 to 5 weight percent, in the range of 0.05 to 3 weight percent, in the range of 0.05 to 2 weight percent, in the range of 0.05 to 1 weight percent, or in the range of 0.1 to 1 weight percent based on the weight of monomers in the monomer composition. The amount of initiator can be used to control the weight average molecular weight of the polymeric group Q. More polymeric chains are formed when greater amounts of the initiator are used. This leads to polymeric chains with a lower weight average molecular weight. Conversely, fewer polymeric chains with a higher weight average molecular weight are formed with smaller amounts of initiator.

The monomer composition used to form the polymeric group Q can also include a chain transfer agent to control the molecular weight. Examples of useful chain transfer agents include, but are not limited to, carbon tetrabromide, alcohols, mercaptans, and mixtures thereof. The use of carboxyl-containing chain transfer agents such as, for example, 3-mercaptopropionic acid is often preferred. These carboxyl-containing chain transfer agent tend to increase the likelihood that the polymeric intermediate involved in the preparation of the compounds of Formula (I) has a carboxyl group.

Chain transfer agents can be used with most ethylenically unsaturated monomers. When a chain transfer agent is used, one end of the polymeric material is often a group derived from the initiator while the other end can be a group derived from the chain transfer agent. At least one of the initiator or chain transfer agent can be selected to provide acidic functionality (e.g., a carboxyl group). Using both an initiator and a chain transfer agent that include an acidic functionality tends to increase the likelihood that most polymeric chains will contain an acidic functionality.

Instead of a chain transfer agent, the monomer composition can include a nitroxide mediating agent such as, for example, 2,2,6,6-tetramethyl-1-piperidinyloxy (TEMPO) commercially available from Alfa Aesar (Ward Hill, Mass.), 1,1,3,3-tetraethyl-2,3-dihydro-1H-isoindolin-2-yloxyl, di-tert-butyl nitroxide, or 4-oxo-TEMPO commercially available from Alfa Aesar. The polymerization reaction is considered to be "living" or "controlled" and can be initiated and terminated as desired. The mechanism of control relies on the reversible coupling of the nitroxide mediating agent to the free radical on the active (i.e., propagating) polymer chain to form an alkoxy amine linkage. The addition of the nitroxide mediating agent makes the polymer chain dormant and unable to further propagate. At certain temperatures, however, the alkoxy amine linkage can be cleaved allowing the polymer chain to become active and continue to grow. Thus, equilibrium between active and dormant polymer chains can be controlled though the selection of the temperature range that is used for polymerization. The temperature range is typically in the range of 100° C. to 160° C. The resulting polymeric material tends to have a relatively narrow molecular weight distribution.

Nitroxide mediating agents are often used in the polymerization of monomers such as styrene. When a nitroxide compound is used, one end of the polymeric material is often a group derived from the initiator and the other end can be the nitroxide compound. At least one of these is typically selected to provide acid functionality (e.g., a carboxyl group). For example, if the initiator is 4,4'-azobis(4-cyanovaleric acid) and the nitroxide mediating agent TEMPO are used, one end of the polymer is usually the group —NH—C(CN)(CH$_3$)—CH$_2$—CH$_2$—COOH. In this example, the carboxyl group is provided by the initiator.

In some cases the nitroxide mediating agent and the initiating species can be obtained from one compound. For example, some alkoxyamine compounds can decompose at a particular temperature to yield both an initiating radical and a nitroxide radical. Such an initiator is described in an article by Messerschmidt et al. (Macromolecules, 41 (2008)). The initiating species from the decomposed alkoxyamine also may have a carboxyl group, leaving the generated polymeric group with a carboxyl group at one end of the chain. The other end of the chain is capped with the nitroxide portion of the decomposed alkoxyamine compound. One such compound described in articles by Leenen et al. (*e-Polymers*, 71 (2005)) and Dufils et al. (*Polymer*, 48 (2007)), is 2-methyl-2-(N-tert-butyl-N-(1'diethylphosphono-2,2'-dimethylpropyl)aminoxyl)propanoic acid.

As used herein, the term "polydispersity" or "polydispersity index" is a measure of the molecular weight distribution and refers to the weight average molecular weight (Mw) divided by the number average molecular weight (Mn) of the polymer. Polymeric materials that are all of the same molecular weight have a polydispersity of 1.0 while polymeric materials that have more than one molecular weight have a polydispersity greater than 1.0. The polydispersity can be determined, for example, using gel permeation chromatography. The polydispersity index is typically less than 10.0, less than 5.0, less than 2.0, less than 1.5, less than 1.4, less than 1.3, less than 1.2, or less than 1.1. When a nitroxide mediating agent is used, the polydispersity index is often in the range of 1.0 to 1.4, in the range of 1.0 to 1.3, or in the range of 1.0 to 1.2. If a non-living polymerization method is used such as when a traditional chain transfer agent is used in place of a nitroxide mediated agent, the polydispersity index is often in the range of 1.5 to 10.0, in the range of 1.5 to 6.0, in the range of 1.5 to 4, in the range of 1.5 to 2.0, in the range of 1.5 to 2.0, or in the range of 1.6 to 2.0.

The compounds of Formula (I) can be formed as shown in Reaction Scheme A.

Reaction Scheme A

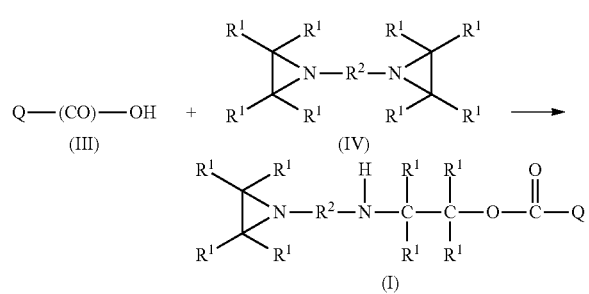

In Reaction Scheme A, the compound of Formula (III) is the carboxyl-terminated polymer. Group Q is a first polymeric group that includes a polymerized product of a first monomer composition that includes at least one ethylenically unsaturated monomer. Group Q is often prepared by free radical polymerization methods. The compound of Formula (IV) is a bis-aziridine compound. The polymeric group Q in Formula (III) and the groups $R^1$ and $R^2$ in Formula (IV) as the same as defined above for Formula (I).

The compound of Formula (III) typically has only one carboxyl group. That is the polymeric group Q usually does not contain a carboxyl group or only a small amount of carboxyl groups. Multiple carboxyl groups in polymeric group Q tend to result in the formation of chemical crosslinks when reacted with the bis-aziridine compound of Formula (IV). However, if the concentration of carboxyl groups is sufficiently low, the likelihood of reaction of these groups with the bis-aziridine compound can be minimized. That is, low levels of carboxyl groups in group Q can be used.

Reaction Scheme A typically uses a molar excess of the aziridinyl groups in the bis-aziridine compound of Formula (IV) compared to the acidic groups in the compound of Formula (III). The number of moles of aziridinyl groups is often at least 2 times, at least 2.5 times, at least 3 times, at least 3.5 times, or at least 4 times the number of moles of acidic groups. This excess tends to minimize the reaction of both of the aziridinyl groups in the bis-aziridine compound with the carboxyl-terminated polymer of Formula (III). The reaction results in the ring opening of one but not both of the aziridinyl rings. The desired product of Formula (I) has an aziridinyl group that has not been ring opened by reaction with the carboxyl-terminated polymer of Formula (III).

Reaction Scheme A typically can occur at room temperature or elevated temperatures (e.g. up to 80° C.) in the presence of a solvent that is miscible with the polymers of Formula (III) and the bis-aziridine compounds of Formula (IV). Suitable solvents for preparation of the compound of Formula (I) include, but are not limited to, toluene, xylenes, ethyl acetate, and methyl ethyl ketone. The resulting aziridinyl-terminated polymer of Formula (I) is then precipitated by the addition of a large amount of solvent that is immiscible with the aziridinyl-terminated polymer. The volume of solvent is often at least 5 times, at least 6 times, at least 8 times, or at least 10 times the volume of the product solution. Suitable solvents for the precipitation of the product (i.e., compounds of Formula (I)) include, but are not limited to, methanol. The precipitated polymeric material can then be filtered and dried. The percent yield is often greater than 85 percent, greater than 90 percent, greater than 92 percent, or greater than 95 percent.

Reaction Scheme A provides a flexible method for preparing the compounds of Formula (I). More specifically, the formation of the intermediate carboxyl-containing compound Q-(CO)OH using a free radical polymerization reaction allows great flexibility in the selection of monomers used to form the polymeric group Q.

Once formed, the first compound of Formula (I) can be reacted with a second polymeric material. Such a reaction results in the formation of an attachment group that grafts the first polymeric group Q to the second polymeric material. The attachment group results from the reaction of the aziridinyl group of the first compound of Formula (I) with the acidic group on the second polymeric material.

Reaction Scheme B is an example of one such reaction. In this reaction scheme, the compound of Formula (I) is reacted with a carboxyl-containing second polymeric material G-(CO)OH to form a grafted compound of Formula (VI). In this reaction scheme, the acidic groups on the second polymeric material are carboxyl groups. The group G in Formulas (V) and (VI) is the remainder of the second polymeric material minus the at least one acidic group.

Reaction Scheme B

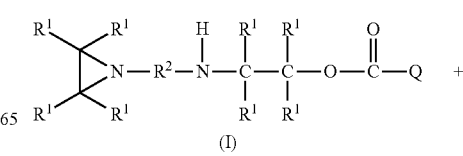

-continued

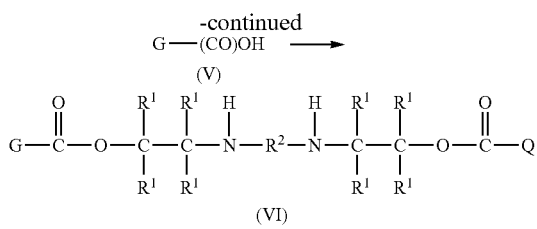

Although the carboxyl-containing compound G-(CO)OH of Formula (V) is shown in this reaction scheme with only one carboxyl group for ease of explanation, this compound can have any suitable number of carboxyl groups. That is, the final product can include multiple groups of formula —(CO)OC$(R^1)_2C(R^1)_2NH$—$R^2$—NH—$C(R^1)_2C(R^1)_2$—O(CO)-Q. If the second polymeric material has multiple carboxyl groups, all or any fraction of these carboxyl groups can react with the compound of Formula (I).

Stated differently, the second polymeric material can have multiple acidic groups and all or any fraction of these acidic groups can react with the compound of Formula (I). The second polymeric material often has multiple acidic groups. The product of the reaction is a grafted copolymer with the second polymeric material being the backbone of the grafted copolymer and with the polymeric groups from the first compound being pendant groups. If the acidic groups are carboxyl groups, the grafted copolymer can have one or more groups of formula —(CO)OC$(R^1)_2C(R^1)_2$NH—$R^2$—NH—$C(R^1)_2C(R^1)_2$—O(CO)-Q where $R^1$, $R^2$, and Q are the same as defined above.

Any polymeric material having at least one acidic group can be used as the second polymeric material. Preferably, the second polymeric material has multiple acidic groups. Some second polymeric materials are formed by polymerization of a second monomer composition that includes an acidic monomer. Suitable acidic monomers typically have an ethylenically unsaturated group plus an acidic group or a salt of an acidic group. The acidic monomer can be, for example, an ethylenically unsaturated carboxylic acid (i.e., the acidic group is a —COOH group), an ethylenically unsaturated phosphonic acid (i.e., the acidic group is a —PO$_3$H$_2$ group), an ethylenically unsaturated sulfonic acid (i.e., the acidic group is a —SO$_3$H group), or a salt thereof. Multiple acidic monomers can be used. If multiple acidic monomers are used, they can have the same or different acidic groups.

Example acidic monomers include, but are not limited to, (meth)acrylic acid, itaconic acid, fumaric acid, crotonic acid, citraconic acid, maleic acid, oleic acid, β-carboxyethyl acrylate, 2-acrylamidoethanesulfonic acid, 2-acrylamido-2-methylpropane sulfonic acid, 2-methacrylamido-2-methylpropane sulfonic acid, 2-sulfoethyl methacrylate, styrene sulfonic acid, vinylsulfonic acid, vinylphosphonic acid, and the like. If the acidic monomer is in the form of a salt, the cation of the salt can be an alkaline metal (e.g., sodium, potassium, or lithium ion), an ion of an alkaline earth (e.g., calcium, magnesium, or strontium ion), an ammonium ion, an ammonium ion substituted with one or more alkyl groups, an ammonium ion substituted with one or more aryl groups, or an ammonium ion substituted by one or more aryl groups and one or more alkyl groups. In many embodiments, the acidic monomer is an ethylenically unsaturated carboxylic acid (i.e., the acid group is a carboxyl group).

In some examples, the second polymeric material is a homopolymer of the acidic monomer. For example, the second polymeric material can be a poly(meth)acrylic acid. In other examples, the second polymeric material is a copolymer formed from a second monomer composition that includes an acidic monomer plus at least one other ethylenically unsaturated monomer. Any of the ethylenically unsaturated monomers described above as suitable monomers for the formation of polymeric group Q in Formula (I) can be used in the second monomer composition.

Some more specific second polymeric materials can be formed, for example, from a second monomer composition that includes (a) a (meth)acrylic acid and (b) at least one (meth)acrylate (i.e., (meth)acrylate ester). The (meth)acrylate ester monomer can be the reaction product of a (meth) acrylic acid with a non-tertiary alcohol. The non-tertiary alcohol typically has 1 to 20 carbon atoms, 1 to 18 carbon atoms, 3 to 18 carbon atoms, 1 to 14 carbon atoms, 1 to 12 carbon atoms, 2 to 12 carbon atoms, 3 to 12 carbon atoms, or 4 to 12 carbon atoms. The alcohol can be of formula $R^{11}$OH where $R^{11}$ is an alkyl group (including a linear alkyl group, branched alkyl group, cycloalkyl group or bicycloalkyl group), alkenyl group, aryl group, or aralkyl group. Suitable examples of non-tertiary alcohols include, but are not limited to, methanol, ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, cyclohexanol, 2-methyl-1-pentanol, 3-methyl-1-pentanol, 4-methyl-2-pentanol, 2-ethyl-1-butanol, 3,5,5-trimethyl-1-hexanol, 3-heptanol, 1-octanol, 2-octanol, 2-ethyl-1-hexanol, 2-methyl-1-hexanol, 1-nonanol, 2-nonanol, 1-decanol, 2-decanol, 1-dodecanol, 1-tridecanol, 2-tridencanol, 1-tetradecanol, 1-octadecanol, 2-octadecanol, citronellol, dihydrocitronellol, 2-propylheptanol, isoborneol, phenylmethanol, phenoxyethanol, and the like.

The (meth)acrylate is often selected from methyl acrylate, ethyl acrylate, n-butyl acrylate, lauryl acrylate, 2-ethylhexyl acrylate, cyclohexyl acrylate, isooctyl acrylate, octadecyl acrylate, nonyl acrylate, decyl acrylate, isobornyl acrylate, dodecyl acrylate, benzyl acrylate, and mixtures thereof.

Other optional co-monomers can also be present in the second monomer composition. These optional co-monomers include, but are not limited to, (meth)acrylamide, N,N-dialkyl(meth)acrylamides (e.g., N,N-dimethylacrylamide and N,N-diethylacrylamide), N,N-dialkylaminoalkyl(meth)acrylate (e.g., N,N'-dimethylaminoethyl(meth)acrylate), (meth)acrylonitrile, vinyl acetate, N-vinyl pyrrolidone, cyanoalkyl (meth)acrylate (e.g., cyanoethyl acrylate), and hydroxyalkyl (meth)acrylates (e.g., hydroxyethylmethacrylate). Still other suitable co-monomers include poly(alkylene oxide) acrylates such as polyethylene glycol acrylate, ethoxyethyl acrylate, and ethoxyethoxyethylacrylate.

The second monomer composition often contains 1 to 30 weight percent (meth)acrylic acid and 70 to 99 weight percent (meth)acrylate (i.e., (meth)acrylate ester). The weight percent is based on a total weight of monomers in the second monomer composition used to prepare the second polymeric material. Polymeric materials having this composition tend to be viscoelastic materials (i.e., elastomeric materials that can flow) with a glass transition temperature that is less than 20° C., less than 10° C., less then 0° C., less than −10° C., or less than −20° C. The resulting grafted copolymers can be used, for example, in various adhesive compositions such as pressure-sensitive adhesive compositions. If higher amounts of (meth)acrylic acid are included, the glass transition temperature and stiffness of the viscoelastic material may become undesirably high. If the (meth)acrylic acid is too low, however, the probability of reacting the viscoelastic material with the first compound diminishes or there are very few grafted sites in the resulting grafted copolymer. The cohesive strength of the grafted polymer and any adhesive containing the grafted copolymer may become unacceptably low if there are too few grafted sites.

In some examples, the second monomer composition contains 1 to 25 weight percent (meth)acrylic acid and 75 to 99 weight percent (meth)acrylate ester, 1 to 20 weight percent (meth)acrylic acid and 80 to 99 weight percent (meth)acrylate ester, 1 to 15 weight percent (meth)acrylic acid and 85 to 99 weight percent (meth)acrylate ester, 1 to 10 weight percent (meth)acrylic acid and 90 to 99 weight percent (meth)acrylate ester, or 5 to 15 weight percent (meth)acrylic acid and 85 to 95 weight percent (meth)acrylate ester based on the total weight of monomers in the second monomer composition.

In addition to monomers, the second monomer composition typically also includes an initiator for free radical polymerization of the various monomers. The polymerization initiator can be a thermal initiator, a photoinitator, or both. Any suitable thermal initiator or photoinitator known for free radical polymerization reactions can be used. The initiator is typically present in an amount in the range of 0.01 to 5 weight percent, in the range of 0.01 to 2 weight percent, in the range of 0.01 to 1 weight percent, or in the range of 0.01 to 0.5 weight percent based on a total weight of monomers in the second monomer composition.

In some embodiments, a thermal initiator is used. The thermal initiator is typically a peroxide, azo compound, persulfate, or redox (reduction-oxidation) system. Suitable peroxides include, but are not limited to, benzoyl peroxide, cyclohexane peroxide, decanoyl peroxide, dicumyl peroxide, dicetyl peroxydicarbonate, and lauryl peroxide. Suitable azo compounds include, but are not limited to, 2,2'-azobis(2-methylbutane nitrile) that is commercially available under the trade designation VAZO 67 from DuPont (Wilmington, Del.), 2,2'-azobis(isobutyronitrile) that is commercially available as VAZO 64 from DuPont, and 2,2'-azobis(2,4-dimethylpentane nitrile) that is commercially available as VAZO 52 from DuPont. Suitable persulfates include, but are not limited to, potassium persulfate, sodium persulfate, and ammonium persulfate. Suitable redox systems include, but are not limited to, the combination of a persulfate with a reducing agent such as sodium metabisulfite or sodium bisulfite, a peroxide in combination with a tertiary amine such as dimethylaniline, or a hydroperoxide (e.g., cumene hydroperoxide) in combination with a transition metal (e.g., cobalt naphthanate).

In some embodiments, a photoinitiator is used. Some example photoinitiators are benzoin ethers (e.g., benzoin methyl ether or benzoin isopropyl ether) and substituted benzoin ethers (e.g., anisoin methyl ether). Other example photoinitiators are substituted acetophenones such as 2,2-diethoxyacetophenone or 2,2-dimethoxy-2-phenylacetophenone (commercially available under the trade designation IRGACURE 651 from Ciba Corp. (Tarrytown, N.Y.) or under the trade designation ESACURE KB-1 from Sartomer (Exton, Pa.)). Still other example photoinitiators are substituted alpha-ketols such as 2-methyl-2-hydroxypropiophenone, aromatic sulfonyl chlorides such as 2-naphthalenesulfonyl chloride, and photoactive oximes such as 1-phenyl-1,2-propanedione-2-(O-ethoxycarbonyl)oxime.

The second monomer composition typically also includes a chain transfer agent to control the molecular weight of the viscoelastic material by regulating the free radical polymerization reaction. Suitable chain transfer agents include, but are not limited to, halogenated hydrocarbons (e.g., carbon tetrabromide) and sulfur compounds such as mercaptans (e.g., lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and mercaptoethyl ether). Certain organic solvents can also function as a chain transfer agent such as ethanol, isopropanol, and ethyl acetate.

The amount of the chain transfer agent that is included in the second monomer composition depends on the desired molecular weight and on the specific chain transfer agent used. Compared to sulfur compounds, for example, organic solvents are usually less active and need to be present in larger quantities. The chain transfer agent is often present in an amount in the range of 0.001 to 10 weight percent based on a total weight of monomers in the second monomer composition. The amount can be in the range of 0.01 to 5 weight percent, 0.01 to 2 weight percent, 0.01 to 1 weight percent, or 0.01 to 0.5 weight percent based on the total weight of monomers in the second monomer composition.

The second polymeric material can be prepared from the second monomer composition using any suitable method or process (e.g., U.S. Pat. No. 5,986,011 (Ellis)). In many embodiments, a method without an inert organic solvent or a method with only a small amount of the inert organic solvent is used (e.g., less than 5 weight percent, less than 3 weight percent, less than 2 weight percent, less than 1 weight percent, or less than 0.5 weight percent based on the total weight of the second monomer composition). Such methods can be used if the monomers and the resulting copolymeric material are miscible with each other. In some embodiments, however, larger amounts of an inert organic solvent are used to provide miscibility of the reactants and product. When included in the second monomer composition, the inert organic solvent is typically no greater than 50 weight percent, no greater than 40 weight percent, no greater than 30 weight percent, no greater than 25 weight percent, no greater then 20 weight percent, no greater than 15 weight percent, or no greater than 10 weight percent based on the total weight of the second monomer composition.

In some processes used to form the second polymeric material, the second monomer composition can be positioned on a sheet, positioned between two sheets, or at least partially surrounded by a packaging material prior to polymerization. The sheets or packaging material are often selected based on the particular polymerization method used to prepare the second polymeric material. Flexible thermoplastic polymers such as, for example, ethylene-vinyl acetate copolymers, ethylene-acrylic acid copolymers, polypropylene, polyethylene, polybutadiene, polyethylene terephthalate, or iconomeric polymers can be used.

In some embodiments, the second monomer composition is polymerized within a packaging material such as a sealed pouch as described in U.S. Pat. No. 5,804,610 (Hamer et al.). The amount of packaging material used typically ranges from about 0.5 weight percent to about 20 weight percent based on a total weight of the packaging material and second monomer composition. For example, the packaging material can be in the range of 1 to 20 weight percent, 1 to 15 weight percent, 2 to 15 weight percent, 1 to 10 weight percent, 2 to 10 weight percent, 1 to 5 weight percent, or 2 to 5 weight percent. The thickness of the packaging material is often in the range of 0.01 millimeters to 0.25 millimeters, in the range of 0.01 to 0.20 millimeters, in the range of 0.01 to 0.10 millimeters, or in the range of 0.03 to 0.10 millimeters. The pouch can have any suitable size but often the size is selected to contain 0.1 to 500 grams, 1 to 500 grams, 1 to 200 grams, 1 to 100 grams, 2 to 100 grams, 5 to 100 grams, or 5 to 50 grams of the second monomer composition.

If a thermal polymerization process is used, suitable sheets or packaging materials typically have melting temperatures that are above the polymerization temperature of the second monomer composition. The sheets or packaging materials often have a melting point of at least 90° C., at least 100° C., or at least 120° C. The melting point is often less than 200° C., less than 175° C., or less than 150° C. The polymerization temperature depends on the activation temperature of the thermal initiator. For example, reactions using 2,2'-azobis (isobutyronitrile) can be carried out at about 80° C. while reactions using 2,2'-azobis(2,4-dimethylpentane nitrile) can be carried out at about 70° C.

In some thermal polymerization processes, the packaging material containing the second monomer composition is immersed within a heat exchange medium for a time sufficient to polymerize the monomers. The heat exchange medium can be, for example, water, perfluorinated liquids, glycerine, or propylene glycol. Alternatively, the heat necessary for thermal polymerization can be provided by placing the packaged second monomer composition in proximity to a heated metal platen, heated metal rollers, or microwave energy.

If a photo-polymerization process is used, suitable sheets or packaging materials typically allow sufficient actinic radiation (e.g., ultraviolet radiation) to reach the second monomer composition through the sheets or packaging materials. Ultraviolet lights are often selected that have at least 60 percent or at least 70 percent of their emission spectra in the range of 280 to 400 nanometers and that have an intensity between about 0.1 to 25 $mW/cm^2$.

During some photo-polymerization processes, the temperature can be controlled by immersing sealed pouches containing the second monomer composition in a water bath or other heat transfer fluid. For example, the packaged second monomer composition can be immersed in a water bath controlled at temperatures up to 90° C. but is often controlled at temperatures no greater than 50° C. The temperature can be controlled, for example, in the range of 5 to 50° C., 5 to 40° C., or 5 to 30° C.

Although any desired molecular weight second polymeric material can be prepared and used in Reaction Scheme B, the weight average molecular weight is often at least 50,000 grams/mole, at least 100,000 grams/mole, at least 200,000 grams/mole, or at least 500,000 grams/mole. In some embodiments, the weight average molecular weight can be up to 3,000,000 grams/mole, up to 2,000,000 grams/mole, or up to 1,000,000 grams/mole. Mixing of the second polymeric material with the first compound of Formula (I) can become more difficult as the molecular weight of the second polymeric material increases.

The weight average molecular weight of the second polymeric material is often in the range of 200,000 to 2,000,000 grams/mole, in the range of 200,000 to 1,000,000 grams/mole, in the range of 500,000 to 2,000,000 grams/mole, or in the range of 500,000 to 1,000,000 grams/mole. If the molecular weight is too high, the second polymeric material does not flow well and preparing coatings from the resulting grafted copolymer can be difficult. If the molecular weight if too low, however, the cohesive strength of the resulting grafted copolymer may be undesirably low.

To prepare a grafted copolymer, the second polymeric material having at least one acidic group (preferably multiple acidic groups) can be reacted with the first compound having both a single aziridinyl group and a first polymeric group. In the case where the acidic groups on the second polymeric material are carboxyl groups, the reaction results in the formation of a grafted copolymer having at least one pendant group (preferably multiple pendant groups) of formula —(CO)OC($R^1$)$_2$C($R^1$)$_2$NH—$R^2$—NH—C($R^1$)$_2$C($R^1$)$_2$—O (CO)-Q where $R^1$, $R^2$, and Q are the same as defined above.

If the second polymeric material is a viscoelastic material formed using a second monomer composition that contains (meth)acrylic acid and a (meth)acrylate ester, the resulting grafted copolymer often has a hydrocarbon backbone with pendant groups that include —(CO)O$R^{11}$ groups and —(CO) OC($R^1$)$_2$C($R^1$)$_2$NH—$R^2$—NH—C($R^1$)$_2$C($R^1$)$_2$—O(CO)-Q groups. The group $R^1$, $R^2$, $R^{11}$, and Q are the same as previously defined. The —(CO)O$R^{11}$ groups are from the (meth) acrylate esters included in the second monomer composition. The pendant groups —(CO)OC($R^1$)$_2$C($R^1$)$_2$NH—$R^2$—NH—C($R^1$)$_2$C($R^1$)$_2$—O(CO)-Q result from reaction of a carboxyl group on the viscoelastic material with the aziridinyl group on the first compound. If there are non-reacted —(CO) OH groups from the (meth)acrylic acid used to form the viscoelastic material, these groups can also be present in the grafted copolymer.

In some embodiments of the grafted copolymer, the second polymeric material is an viscoelastic material formed from a second monomer composition that contains (meth)acrylic acid and a (meth)acrylate ester while the first compound is selected to have a first polymeric group Q that is not miscible with the viscoelastic material. That is, the first polymeric group Q phase separates from the viscoelastic material. This phase separation results in the formation of separate domains of the first polymeric group that can function as physical crosslinks for the grafted copolymer. The grafted copolymer often can be used as an adhesive such as a pressure sensitive adhesive. The cohesive strength of the adhesive tends to increase with the introduction of more grafted groups (i.e., through the introduction of more —(CO)OC($R^1$)$_2$C($R^1$)$_2$NH—$R^2$—NH—C($R^1$)$_2$C($R^1$)$_2$—O(CO)-Q pendant groups) in the grafted compound.

Physical crosslinking typically relies on the natural or induced formation of entanglements within polymeric chains and tends to increase the cohesive strength of the grafted copolymer. Physical crosslinking is often desired because the grafted copolymer can be processed in a melted state at relatively high temperatures yet can take on a crosslinked form at lower temperatures. The grafted copolymer is melt processable and the resulting crosslinking is reversible. That is, the grafted copolymer can be repeatedly heated to flow and then cooled again to form a physically crosslinked material. In contrast, chemical crosslinked copolymers typically cannot be processed as hot melt adhesives.

To phase separate from the second polymeric material that is viscoelastic and to provide physical crosslinking, the first compound is often selected to be immiscible in the second polymeric material at ambient temperatures. Physical crosslinking is enhanced when the first compound has a glass transition temperature greater than or equal to at least 20° C. To form such a first compound, the monomers used to form the first polymeric group Q are often selected to have a glass transition temperature equal to at least 20° C. or at least 50° C. when polymerized as a homopolymer. Suitable monomers can be (meth)acrylates or various vinyl monomers such as vinyl ether monomers, vinyl aryl monomers, vinyl heterocyclic monomers, vinyl ester monomers, and the like.

Some specific monomers for forming polymeric group Q that can phase separate from (meth)acrylate-based viscoelastic materials used as the second polymeric material include, but are not limited to, methyl methacrylate, ethyl methacrylate, isopropyl methacrylate, isobutyl methacrylate, tert-butyl methacrylate, tert-butyl acrylate, cyclohexyl methacrylate, phenoxyethyl acrylate, phenoxyethyl methacrylate, isobornyl methacrylate, isobornyl acrylate, phenyl methacrylate, benzyl methacrylate, nonylphenol methacrylate, cetyl acrylate, dicyclopentenyl(meth)acrylate, isobornylcyclohexyl acrylate, tetrahydrofurfuryl methacrylate, trifluoroethyl methacrylate, 1-adamantyl methacrylate, dicyclopentenyloxylethyl(meth)acrylate, dicyclopentanyl(meth)acrylate, 3,3,5 trimethylcyclohexyl(meth)acrylate, styrene, alpha-methyl styrene, alkyl substituted styrene (e.g., vinyl toluene, dimethylstyrene, ethylstyrene, isopropylstyrene, tert-butylstyrene), 2-vinyl pyridine, 4-vinyl pyridine, n-vinyl caprolactam, vinyl acetate, vinyl proprionate, or mixtures thereof.

In addition to the glass transition temperature, the molecular weight of the first compound (e.g., the molecular weight of the polymeric group Q) can affect whether or not the grafted copolymer will phase separate and physically crosslink. Phase separation is more likely if the molecular weight of the polymeric group Q in the first compound has a weight average molecular weight of at least 5000 grams/mole. That is, the first compound is selected to have a weight average molecular weight that is greater than 5000 grams/mole. The weight average molecular weight of the group Q is often greater than 7,500 grams/mole, greater than 10,000 grams/mole, greater than 12,000 grams/mole, greater than 15,000 grams/mole, or greater than 20,000 grams/mole. Cohesive strength of the pressure-sensitive adhesive tends to increase as the weight average molecular weight of the polymeric group Q increases.

If the molecular weight of the polymeric group Q becomes too large, however, the number of pendant groups formed on a weight basis by reaction with the viscoelastic material may be diminished. That is, as the weight of the polymeric group Q increases, it can become more difficult to form many pendant groups of formula —(CO)OC($R^1$)$_2$C($R^1$)$_2$NH—$R^2$—NH—C($R^1$)$_2$C($R^1$)$_2$—O(CO)-Q on a weight basis. The weight average molecular weight of polymeric group Q is often up to 150,000 grams/mole. For example, the weight average molecular weight can be up to 120,000 grams/mole, up to 100,000 grams/mole, up to 80,000 grams/mole, up to 60,000 grams/mole or up to 40,000 grams/mole.

The grafted copolymer is often prepared from a reaction mixture that includes at least 0.5 weight percent of the first compound based on a total weight of polymeric material (e.g., first compound plus the second polymeric material). For example, the reaction mixture used to form the grafted copolymer can contain 0.5 to 20 weight percent of the first compound and 80 to 99.5 weight percent of the second polymeric material based on a total weight of polymeric material (e.g., first compound and second polymeric material) in the reaction mixture. This reaction mixture often contains 1 to 15 weight percent first compound and 85 to 99 weight percent second polymeric material, 1 to 10 weight percent first compound and 90 to 99 weight percent second polymeric material, or 5 to 15 weight percent first compound and 85 to 95 weight percent second polymeric material.

Similarly, because the majority of the weight of the first compound is often due to the first polymeric group Q, the grafted copolymer often contains at least 0.5 weight percent, at least 1 weight percent, at least 2 weight percent, or at least 5 weight percent group Q based on a total weight of the grafted copolymer. The grafted copolymer can contain, for example, up to 20 weight percent, up to 15 weight percent or up to 10 weight percent of group Q. The concentration of group Q in the grafted copolymer is often in the range of 0.5 to 20 weight percent, 1 to 20 weight percent, 2 to 20 weight percent, 5 to 20 weight percent, 1 to 15 weight percent, 1 to 10 weight percent, or 2 to 10 weight percent based on the total weight of the grafted copolymer.

Some specific grafted copolymers are formed from a viscoelastic second polymeric material and a first compound that is not miscible with the viscoelastic second polymeric material. More specifically, the Q polymeric group phase separates from the viscoelastic portion of the grafted copolymer. The first compound can have a Q polymeric group that is homopolymer such as a poly(vinyl aryl monomer) (e.g., poly (styrene), a block copolymer having a first block of poly(vinyl aryl monomer) and a second block of poly(vinyl heterocyclic monomer) (e.g., di-block poly(styrene-co-vinyl pyridine), a random copolymer of a poly(vinyl aryl monomer) and a poly (vinyl heterocyclic monomer) (e.g., random poly(styrene-co-vinyl pyridine). Alternatively, the compound can have a Q polymeric group that is a poly(meth)acrylate such as, for example, poly(benzyl methacrylate), poly(methyl methacrylate), poly(phenoxyethyl acrylate), or poly(isobornyl acrylate-co-benzyl methacrylate) that is either a random or block copolymer. The viscoelastic material can be a polymerized product of a second monomer composition that contains a (meth)acrylic acid and (meth)acrylate ester.

To prepare the grafted copolymer, the second polymeric material (e.g., the viscoelastic material) is often reacted with the first compound using a hot melt process. Hot melt processing is often considered desirable because the use of inert organic solvents can be minimized or eliminated. That is, the blending step of the grafted copolymer with the polyamide is often solvent free or substantially solvent free. As used herein, the term "substantially solvent free" means that the composition has no greater than 2 weight percent, no greater than 1 weight percent, no greater than 0.5 weight percent, or no greater than 0.1 weight percent solvent based on a total weight of the composition. No solvent or only low levels of solvent can be desirable from both an environmental and economic perspective. The viscoelastic material is prepared and then mixed with the first compound. Any suitable hot melt method can be used to mix the first compound with the second polymeric material. In some methods, the viscoelastic material is positioned within a packaging material (e.g., the viscoelastic material can be prepared within the packaging material) such as a pouch that is combined with the first compound within a mixing device such as one of those commercially available from C.W. Brabender (Hackensack, N.J.) or an extruder. The mixing device can break open the packaging material surrounding the viscoelastic material, melt the packaging material, or both.

Any suitable reaction time and temperature can be used that are sufficient to form the grafted copolymer and optionally melt the packaging material. For example, the first compound can be mixed with the viscoelastic material at temperatures equal to at least 100° C., at least 110° C., or at least 120° C. for at least 1 minute, at least 2 minutes, at least 5 minutes, at least 10 minutes, or at least 20 minutes. A temperature and time are often selected such that the packaging material melts but insufficient to degrade the first compound, the second polymeric material, or both. The amount of packaging material and the type of packaging material are selected so that desired properties of the grafted compound are not adversely affected by the packaging material.

The grafted copolymer is blended with a polyamide to form a blended composition. The addition of the polyamide can further enhance the cohesive strength of the grafted composition. This further enhancement in cohesive strength may be attributable to hydrogen bonding within the polyamide, hydrogen bonding between the polyamide and the grafted copolymer, or both. The cohesive strength of the blended composition (i.e, blend) is typically greater than the cohesive strength of the grafted copolymer alone and greater than the cohesive strength obtained by adding the polyamide to the viscoelastic material used to form the grafted copolymer. The enhanced cohesive strength of the blend is often greater than the sum of the increased cohesive strength obtained by formation of the grafted copolymer from the viscoelastic material and the increased cohesive strength obtained by adding the polyamide to the viscoelastic material used to form the grafted copolymer.

Any suitable polyamide can be used. The polyamide can have aliphatic segments, aromatic segments, or a combination thereof separated by amido groups. The amido groups are usually in the backbone of the polyamide. Suitable polyamides are typically selected 1) to have a melting temperature no greater than 200° C., 2) to be at least partially soluble in the composition at blending temperature, or 3) both 1) and 2).

A first class of polyamides has a melting point no greater than 200° C. Some suitable polyamides have a melting temperature no greater than 190° C., no greater than 180° C., no greater than 170° C., or no greater than 160° C. The melting temperature typically increases with the concentration of amido groups included in the polyamide. Polyamides that have a melting point no greater than 200° C. can be blended with the grafted copolymer by melt processing. That is, both the grafted copolymer and the polyamide can be blended in a molten state at blending temperatures no greater than 200° C. If higher blending temperatures than about 200° C. are used, there is an increased likelihood that the grafted copolymer might undergo at least some degradation. However, blending temperatures greater than 200° C. can be used if the time the materials are at this temperature is relatively short.

Alternatively, the grafted copolymer and the polyamide can be blended at temperatures lower than the melting temperature of the polyamide if the blending temperature is sufficiently high to dissolve the polyamide in the composition to an extent that good mixing results. The polyamide can dissolve in the grafted copolymer, in an inert solvent included in the blended composition, or both.

Suitable polyamides with a melting point no greater than 200° C. can have aromatic segments, aliphatic segments, or a combination thereof. The aliphatic segments can be linear, cyclic, or branched. The aliphatic segments can have carbon backbones or can have heteroatoms included with the carbon atoms in the backbone. The aliphatic segments can be saturated or partially unsaturated. In some embodiments the aliphatic segments are alkylene or heteroalkylene groups.

Some example polyamides with a melting point no greater than 200° C. are polyether-based polyamides. That is, these polyamides have at least one polyether segment (i.e., a heteroalkylene segment having a plurality of groups of formula —$(CH_2)_nO$— wherein n is an integer equal to at least 1). The polyether segments are often repeat units of formula —$CH_2CH_2O$—, —$CH_2CH_2CH_2O$—, —$CH_2CH_2CH_2CH_2O$—, or the like. Suitable polyether-based polyamides are often block copolymers and can further include at least one alkylene segment. Specific polyether-based polyamides include, but are not limited to, those commercially available under the trade designation PEBAX (e.g., PEBAX 1205, PEBAX 2533, and PEBAX 6333) from Arkema Inc. (Philadelphia, Pa.).

Other example polyamides with a melting point no greater than 200° C. are dimer acid-based polyamides. Dimer acids are typically formed by the dimerization of unsaturated fatty acids having 18 carbon atoms such as oleic acid or tall oil fatty acid. The dimer acids are often at least partially unsaturated and often contain 36 carbon atoms. The dimer acid-based polyamides are frequently formed using a condensation reaction of dimer acid with a diamine. The diamines are often alkylene diamines or heteroalkylene diamines. Specific dimer acid-based polyamides include, but are not limited to, those commercially available under the trade designation MACROMELT (e.g., MACROMELT 6240) from Henkel (Rocky Hill, Conn.).

Still other example polyamides with a melting point no greater than 200° C. are poly(lactams) such as poly(lauryl lactam). There polyamides, which are formed by ring opening reactions, have a plurality of alkylene segments (e.g., such as an alkylenes with 11 carbon atoms) separated by amido groups. An example poly(lactam) is poly(lauryl lactam) that is commercially available under the trade designation NYLON 12 from Scientific Polymer Products, Inc. (Ontario, N.Y.).

Other suitable polyamides are those that can at least partially dissolve in the blended composition at the blending temperature. The melting point for this class of polyamides can be no greater than 200° C. or can be greater than 200° C. When the melting point is not greater than 200° C., they can be blended as discussed above for the first class of polyamides. When the melting temperature of the polyamide is greater than 200° C., the polyamide can be blended with the grafted copolymer at blending temperatures greater than 200° C. provided that combined temperature and time and temperature is selected to minimize or prevent degradation of the grafted copolymer. In yet another method, the grafted copolymer and the polyamide can be blended at temperatures lower than the melting temperature of the polyamide if the blending temperature is sufficiently high to dissolve the polyamide in the composition to an extent that results in good mixing. The polyamide can dissolve in the grafted copolymer, in an inert solvent included in the blended composition, or both.

As used herein, the term "partially dissolved" means that at least 50 weight percent, at least 60 weight percent, at least 70 weight percent, at least 80 weight percent, at least 90 weight percent, at least 95 weight percent, at least 98 weight percent, at least 99 weight percent, at least 99.5 weight percent, or at least 99.8 weight percent of the polyamide dissolves at the blending temperatures. In some embodiments, the formation of a transparent blended composition at the blended temperature is desired. The blending temperature is selected based on the particular grafted copolymer (e.g., it is selected to minimize or prevent degradation of the grafted copolymer) and the polyamide included in the blend. If an inert solvent is present, the blending temperature is often lower than the boiling temperature of the inert solvent. The blending temperature is often in the range of ambient temperature to 300° C., in the range of ambient temperature to 250° C., or in the range of ambient temperature to 200° C.

Polyamides of the second class typically have an aliphatic segment and an arylene segment. The arylene segment often includes phenylene and the aliphatic segment is often an alkylene or heteroalkylene. This type of polyamides can be prepared, for example, by the condensation reaction of terephthalic acid, isophthalic acid, or a combination thereof with an alkylene diamine, heteroalkylene diamine, or combination thereof. Suitable alkylene diamines are often branched or cyclic alkylene groups with 6 to 12 carbon atoms. One example is a polyamide of the following chemical structure where the alkylene group is branched and contains 9 carbon atoms. The variable n is greater than 3, greater than 10, greater than 20, or greater than 50.

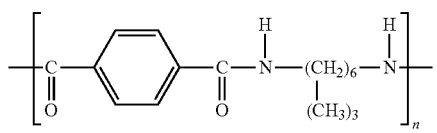

Such a polyamide is commercially available under the trade designation TROGAMID (e.g., TROGAMID T) from Evonik Degussa Corporation (Parsippany, N.Y.). Similar polyamides are commercially available from other suppliers such as Scientific Polymer Products, Inc. (Ontario, N.Y.) under the trade designation NYLON 6(3)T.

Suitable polyamides can have any molecular weight that allows mixing with the grafted copolymer. Although the particular molecular weight that is suitable can be dependent upon the chemical composition of the polyamide, the number average molecular weight is often at least 10,000 grams/mole, at least 20,000 grams/mole, or at least 50,000 grams/mole. The number average molecular weight can be up to 500,000 grams/mole or even higher. For example, the number average molecular weight can be up to 400,000 grams/mole, up to 300,000 grams/mole, up to 200,000 grams/mole, or up to 100,000 grams/mole. In some examples, the number average molecular weight is in the range of 10,000 to 500,000 grams/mole, in the range of 50,000 to 500,000 grams/mole, or in the range of 50,000 to 300,000 grams/mole.

The blended composition (e.g., grafted copolymer and polyamide) typically has a higher cohesive strength than the grafted copolymer alone. This enhanced cohesive strength may be attributable to hydrogen bonding between the amido groups of the polyamide and various polar groups of the grafted copolymer, to hydrogen bonding within the polyamide itself, or to a combination thereof. These bonds often can be disrupted at elevated temperatures (e.g., 100° C. to 200° C.) allowing the coating of the blending compositions. Upon cooling to room temperature, however, the hydrogen bonds form to provide the enhanced cohesive strength. The increase in cohesive strength is roughly proportional to the amount of added polyamide included in the blended composition.

As more polyamide is added to the blended composition, the modulus and glass transition temperature of the composition can increase. If the blended composition is to be used as an adhesive composition such as a pressure-sensitive adhesive composition, the amount of polyamide in the blend is typically no greater than 20 weight percent based on a total weight of the blended composition. If the amount of polyamide is higher, the blended composition might not have the usual characteristics of pressure-sensitive adhesives. That is, the glass transition temperature, the modulus, or both may increase to the point that the composition no longer functions as a pressure-sensitive adhesive.

The blended composition (i.e., blend) often includes 0.5 to 20 weight percent polyamide and 80 to 99.5 weight percent grafted copolymer based on the total weight of the blended composition. Some blends contain 1 to 20 weight percent polyamide and 80 to 99 weight percent grafted copolymer, 2 to 20 weight percent polyamide and 80 to 98 weight percent grafted copolymer, 1 to 15 weight percent polyamide and 85 to 99 weight percent grafted copolymer, 2 to 15 weight percent polyamide and 85 to 98 weight percent grafted copolymer, 1 to 10 weight percent polyamide and 90 to 99 weight percent grafted copolymer, 2 to 10 weight percent polyamide and 90 to 98 weight percent grafted copolymer, or 5 to 10 weight percent polyamide and 90 to 95 weight percent grafted copolymer.

The blended composition of the grafted compound and the polyamide can be used as an adhesive such as a pressure-sensitive adhesive. As such, the composition can be tacky. If more tackiness is desired, however, additional tackifiers can be included in the blended composition. Any tackifier typically included in pressure-sensitive adhesive compositions can be used. Either solid or liquid tackifiers can be added. Solid tackifiers generally have a number average molecular weight (Mn) no greater than about 10,000 grams/mole and a softening point above about 70° C. Liquid tackifiers are viscous materials that have a softening point of about 0° C. to about 70° C. Solid tackifying resins are generally preferred.

Suitable tackifying resins include rosins and their derivatives (e.g., rosin esters); polyterpenes and aromatic-modified polyterpene resins; coumarone-indene resins; and hydrocarbon resins such as alpha pinene-based resins, beta pinene-based resins, limonene-based resins, aliphatic hydrocarbon-based resins, aromatic-modified hydrocarbon-based resins, aromatic hydrocarbon resins, and dicyclopentadiene-based resins. These tackifying resins, if desired, can be hydrogenated to lower their color contribution to the pressure-sensitive adhesive. In some embodiments, the tackifier is selected to be miscible with the viscoelastic material used to form the grafted copolymer but not with the polymeric group Q in the grafted copolymer.

When a tackifier is added to the blended composition, the composition often contains 0.5 to 50 weight percent tackifier based on the total weight of the blend (e.g., weight of tackifier, grafted copolymer, and polyamide). In some embodiments, the blended composition contains 1 to 50 weight percent, 1 to 40 weight percent, 5 to 40 weight percent, 1 to 30 weight percent, 5 to 30 weight percent, 1 to 20 weight percent, or 5 to 20 weight percent tackifier.

The blended compositions that include tackifier can contain, for example, 1 to 50 weight percent tackifier, 30 to 98.8 weight percent grafted copolymer, and 0.2 to 20 weight percent polyamide based on a total weight of the blended composition. Some examples contain 1 to 40 weight percent tackifier, 40 to 98.5 weight percent grafted copolymer, and 0.5 to 20 weight percent polyamide. Other examples contain 1 to 30 weight percent tackifier, 50 to 98 weight percent grafted copolymer, and 1 to 20 weight percent polyamide. Still other examples contain 1 to 30 weight percent tackifier, 60 to 98 grafted copolymer, and 1 to 10 weight percent polyamide.

Other materials commonly added to adhesive compositions such as fillers, plasticizers, and the like can be added to the blended compositions.

The polyamide can be blended with the grafted copolymer after formation of the grafted copolymer. Alternatively, the polyamide can be blended with the first compound of Formula (I) and with the second polymeric material that is a viscoelastic material. Stated differently, the grafted copolymer can be formed in the presence of the polyamide. In many embodiments, the grafted copolymer is formed and blended with the polyamide using a hot melt process. Any suitable hot melt method can be used to prepare the grafted copolymer and to blend the resulting grafted copolymer with the polyamide. In some methods, the second polymeric material (viscoelastic material) is positioned within a packaging material (e.g., the viscoelastic material can be prepared within the packaging material) such as a polymeric pouch that is combined with the first compound within a mixing device such as one of those commercially available from C.W. Brabender (Hackensack, N.J.) or an extruder. The mixing device can break open the packaging material surrounding the viscoelastic material, melt the packaging material, or both. Once the package is broken, the viscoelastic material reacts with the first compound forming the grafted copolymer. The resulting grafted copolymer is then blended with the polyamide.

This temperature is typically selected to be sufficiently high to react the first compound with the second polymeric material and to form a molten grafted copolymer. The grafted copolymer is then mixed with the polyamide while the grafted copolymer is in a molten state. The temperature is typically selected so that the polyamide is also molten or at least partially dissolved so as to adequately mix with the grafted copolymer. The temperature for the combined grafted copolymer preparation and blending with the polyamide is often selected to be no greater than 200° C. Higher temperatures can be used is the time and temperature combination are selected to prevent or minimize degradation of the grafted copolymer.

The blended composition is often delivered as a film or coating using a die. This film or coating is often positioned on one or both major surfaces of a substrate. Any suitable substrate can be used such as those formed from metal-containing materials, polymeric materials, ceramic materials, or glasses. The substrate can be rigid or flexible, clear or opaque, and of any suitable thickness. If the film or coating is a pressure-sensitive adhesive, the substrate can be a backing material. Suitable backings include, but are not limited to, paper, cloth (woven or non-woven), poly(vinyl chloride), polyurethane, polyolefin (e.g., polyethylene, polypropylene, or copolymers thereof), polyesters such as polyethylene terephthalate, nylon, polycarbonate, poly(ethylene vinyl acetate), poly(ethylene acrylic acid), foams such as those prepared from polyurethanes or polyacrylates, metal foil, and the like.

In some embodiments, the blended composition is positioned between two substrates. The first substrate can be, for example, a backing suitable for a pressure-sensitive adhesive and the second substrate can be a release liner. Any suitable release liner can be used such as, for example, a backing coated with a silicone coating (silicone release liner), polyfluorpolyether coating, or polyfluoroethylene coating.

The blended composition can have both physical crosslinking and hydrogen bonding to provide cohesive strength. While physical crosslinking relies on phase separation within the grafted copolymer, hydrogen bonding does not depend on phase separation. Rather, hydrogen bonding relies on the interaction of the amido groups on the polyamide with various polar groups on the grafted copolymer, with various other polar groups within the polyamide, or both. These two approaches for improving the cohesive strength result in a cooperative or synergistic effect. That is, the enhanced cohesive strength is greater than the summation of the enhancement obtained using hydrogen bonding alone and the enhancement obtained using physical crosslinking alone.

The blended compositions can be fluid at elevated temperatures and then physically crosslink and hydrogen bond when cooled to room temperature. This type of crosslinking and bonding can be reversible. That is, the blended composition can be repeatedly heated to a fluid or molten state and cooled again. The physical crosslinking and hydrogen bonding can reform repetitively upon cooling from the fluid or molten state.

No additional crosslinking (e.g., chemical crosslinking, photocrosslinking, or electron beam crosslinking) are needed to achieve the desired cohesive strength. This is particularly advantageous because the cohesive strength can be achieved without the typical problems associated with photocrosslinking and electron beam crosslinking techniques such as a limited depth of radiation penetration, significant capital investment, line speed limitations, and high additive loadings.

Furthermore, the combined used of both physical crosslinking and hydrogen bonding allows the use of viscoelastic compounds (second polymeric material used to form the grafted copolymer) with low acid content in the formation of the grafted copolymer. In these systems, the use of either physical crosslinking or hydrogen bonding alone is typically inadequate to provide the desired cohesive strength. The combination of physical crosslinking and hydrogen bonding can result in the formation of blended compositions with good cohesive strength. These systems are often desirable for medical and electronic applications.

Various items are provided that are compositions or methods of making compositions.

Item 1 is composition that is a blended composition. The composition include a) a grafted copolymer and b) a polyamide. The grafted copolymer contains a product of a reaction mixture that includes 1) a first compound of Formula (I)

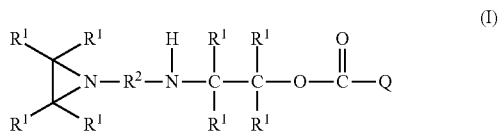

and 2) a second polymeric material having at least one acidic group. In Formula (I), each $R^1$ is independently hydrogen or an alkyl. Group $R^2$ is a divalent group containing an alkylene, heteroalkylene, arylene, heteroarylene, or a combination thereof and optionally further containing an oxy, carbonyl, carbonyloxy, carbonylimino, —$NR^3$—, or a combination thereof. Group $R^3$ is hydrogen or an alkyl. Group Q is a first polymeric group that includes a polymerized product of a first monomer composition containing at least one ethylenically unsaturated monomer. The polyamide included in the blend is selected 1) to have a melting temperature no greater than 200° C., 2) to be at least partially soluble in the composition at blending temperature, or 3) both 1) and 2).

Item 2 is the composition of item 1, wherein the composition is an adhesive.

Item 3 is the composition of item 1 or 2, wherein the composition is a pressure-sensitive adhesive.

Item 4 is the composition of any one of items 1 to 3, wherein the composition is hot melt processable.

Item 5 is the composition of any one of items 1 to 4, wherein the polyamide is present in an amount in a range of 0.5 to 20 weight percent based on a total weight of the composition.

Item 6 is the composition of any one of items 1 to 5, wherein the polyamide is a block copolymer having at least one polyether segment.

Item 7 is the composition of any one of items 1 to 6, wherein the polyamide is a block copolymer having (a) at least one polyether segment and (b) at least one alkylene segment.

Item 8 is the composition of any one of items 1 to 5, wherein the polyamide has a plurality of alkylene or heteroalkylene segments.

Item 9 is the composition of any one of items 1 to 5, wherein the polyamide is a block copolymer having (a) at least one alkylene or heteroalkylene segment and (b) at least one arylene segment.

Item 10 is the composition of any one of items 1 to 5, wherein the polyamide is a product of a reaction mixture comprising (a) an alkylene diamine, heteroalkylene diaminer, or a combination thereof and (b) a dimer acid.

Item 11 is the composition of any one of items 1 to 10, wherein the second polymeric material is a polymerized product of a second monomer composition comprising (a) (meth)acrylic acid and (b) at least one (meth)acrylate ester.

Item 12 is the composition of any one of items 1 to 11, wherein group Q is phase separated from the second polymeric material in the grafted copolymer.

Item 13 is the composition of any one of items 1 to 12, wherein the at least one ethylenically unsaturated monomer used to form Q is selected to have a glass transition temperature equal to at least 20° C. when polymerized as a homopolymer.

Item 14 is the composition of any one of items 1 to 13, wherein Q is has a weight average molecular weight greater than 5000 grams/mole.

Item 15 is the composition of any one of items 1 to 14, wherein the first monomer composition comprises styrene, alpha-methyl styrene, or an alkyl substituted styrene.

Item 16 is the composition of any one of items 1 to 14, wherein the first monomer composition comprises a (meth) acrylate ester, (meth)acrylamide, or a combination thereof.

Item 17 is the composition of any one items 1 to 14, wherein the group Q is a random copolymer and the first monomer composition comprises a vinyl aryl monomer and a vinyl heterocyclic monomer.

Item 18 is the composition of any one of items 1 to 14, wherein the group Q is a block copolymer and the first monomer composition comprises a first block of poly(vinyl aryl monomer) and a second block of poly(vinyl heterocyclic monomer).

Item 19 is the composition of any one of items 1 to 18, wherein the composition further comprises a tackifier.

Item 20 is the composition of item 19, wherein the composition comprises 1 to 50 weight percent tackifier, 30 to 98.8 weight percent grafted copolymer, and 0.2 to 20 weight percent polyamide based on a total weight of the blended composition.

Item 21 is a method of making a composition. The method includes providing a grafted copolymer and blending the grafted copolymer with a polyamide. The grafted copolymer contains a product of a reaction mixture that includes 1) a first compound of Formula (I)

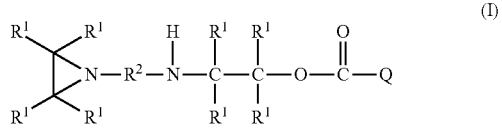

and 2) a second polymeric material having at least one acidic group. In Formula (I), each $R^1$ is independently hydrogen or an alkyl. Group $R^2$ is a divalent group containing an alkylene, heteroalkylene, arylene, heteroarylene, or a combination thereof and optionally further containing an oxy, carbonyl, carbonyloxy, carbonylimino, —$NR^3$—, or a combination thereof. Group $R^3$ is hydrogen or an alkyl. Group Q is a first polymeric group that includes a polymerized product of a first monomer composition containing at least one ethylenically unsaturated monomer. The polyamide included in the blend is selected 1) to have a melting temperature no greater than 200° C., 2) to be at least partially soluble in the composition at blending temperature, or 3) both 1) and 2)).

Item 22 is the method of item 21, wherein the grafted copolymer is formed in the presence of the polyamide.

Item 23 is the method of item 21 or 22, wherein the composition is solvent free or substantially solvent free during the blending step.

Item 24 is the method of any one of items 21 to 23, wherein the polyamide and grafted copolymer are both in a molten state at the blending temperature.

Item 25 in the method of any one of items 21 to 23, wherein the blending temperature is lower than the melting temperature of the polyamide.

EXAMPLES

All percents are based on weight unless otherwise indicated.

The materials used in the following examples were purchased from Alfa Aesar (Ward Hill, Mass.) or Sigma-Aldrich Company (St. Louis, Mo.) unless otherwise stated.

Inhibitor removal from the monomers was done by passing the monomers through a column packed with Inhibitor Removal Resin (CAS #9003-70-7) from Alpha Aesar (Ward Hill, Mass.). Monomers, such as styrene and vinyl pyridine, treated in this manner are referred to as "treated monomers".

Test Method for Molecular Weight Distribution

The molecular weight distribution of the compounds was characterized using conventional gel permeation chromatography (GPC). The GPC instrumentation, which was obtained from Waters Corporation (Milford, Mass.), included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns, available from Varian Inc. (Palo Alto, Calif.).

Samples of polymeric solutions were prepared by dissolving polymer or dried polymer samples in tetrahydrofuran at a concentration of 0.5 percent (weight/volume) and filtering through a 0.2 micron polytetrafluoroethylene filter that is available from VWR International (West Chester, Pa.). The resulting samples were injected into the GPC and eluted at a rate of 1 milliliter per minute through the columns maintained at 35° C. The system was calibrated with polystyrene standards using a linear least squares analysis to establish a calibration curve. The weight average molecular weight (Mw) and the polydispersity index (weight average molecular weight divided by number average molecular weight) were calculated for each sample against this standard calibration curve.

Test Method for Shear Strength at Room Temperature

Shear tests were conducted using 25.4 millimeter (mm) wide test strips prepared as described in the examples. A stainless steel panel was cleaned by wiping with acetone and drying. Test strips were applied to the panel such that a 25.4 mm by 25.4 mm portion of each test strip was in firm contact with the panel and one end portion of each test strip was free. The panel with adhered test strips was held in a rack so that the panel formed an angle of 180 degrees with the extended free end. A one kilogram weight was attached to the free end of each test strip. The test was conducted at room temperature (approximately 23° C.) and the time elapsed for each test strip to separate from the test panel was recorded as the shear strength in minutes. Two shear tests were performed for each sample and the results were averaged.

Test Method for Peel Adhesion Force

Peel adhesion force was measured using test strips prepared as described in the examples. A stainless steel panel was cleaned by wiping with acetone and drying. Test strips measuring 1.25 centimeters (cm) wide by 10 to 12 cm long were adhered to the panel by rolling twice with a 2 kilogram (kg) hard rubber roller. The free end of the test strip was doubled back so that the angle of removal was 180 degrees, and attached to the horizontal arm of an adhesion tester scale (Slip/peel tester model 3M90, obtained from Instrumentors Inc. Strongsville, Ohio). The stainless steel plate was attached to a platform that moved at a rate of 12 inches per minute (30.5 cm/min.) away from the scale. The peel test was started soon after the test strip was applied to the test panel without allowing time for adhesion to build. The average of the peak and minimum forces (in Newtons) during the peel test were recorded. Three peel tests were run for each sample and averaged to yield the peel force value.

Preparatory Example P1

Aziridinyl-Terminated Polystyrene

A composition for an carboxyl-terminated (acid-containing) polystyrene polymer was prepared by adding 300 grams of styrene monomer, 7 grams of 4,4' azobis(4-cyanovaleric acid) initiator, 1.8 grams of 2,2,6,6-tetramethyl-1-piperidinyloxy (TEMPO), and 55 grams of xylene solvent to a multi-neck 1,000 milliliter (mL) flask fitted with a condenser, mechanical stirrer, and nitrogen purge line. The flask was sealed with a septum and bubbled with nitrogen for 30 minutes. The flask was then placed in a heated oil bath at 145° C. and held at that temperature for 10 hours while stirring. During the reaction, the initially red solution changed to a light yellowish color and the solid initiator dissolved. The product was cooled in the flask and a sample was removed for GPC and H-NMR analyses. Based on GPC analysis, the conversion of styrene monomer was approximately 85 percent and the weight average molecular weight (Mw) of the carboxyl-terminated polystyrene polymer was approximately 15,500 grams/mole with a polydispersity of 1.3.

An aziridinyl-terminated poly(styrene) was prepared by adding 600 grams of a 5 weight percent solution of 1,1'-isophthalaylbis(2-methylaziridine)

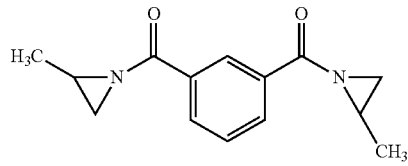

in toluene to the cooled flask and mixing for 24 hours at room temperature (about 20 to 25° C.). The resulting solution was slowly added to 6 fold (by volume) excess of cold methanol. The precipitated aziridine terminated poly(styrene) polymer was filtered, collected, and dried under vacuum. The weight average molecular weight of the polymer was approximately 15,600 grams/mole with a polydispersity index of 1.36.

Preparatory Example P2

Aziridinyl-Terminated Poly(Methyl Methacrylate)

A composition for an carboxyl-terminated (acid-containing) poly(methyl methacrylate) polymer was prepared by adding 294 grams of methyl methacrylate (MMA), 5.4 grams of 3-mercaptopropionic acid (MPA), 0.96 grams of thermal initiator 2,2'-azobis(2-methylbutyronitrile) sold as VAZO-67, and 250 grams of toluene to a narrow necked glass bottle containing a magnetic stir bar and mixing well. The composition was bubbled with nitrogen for 30 minutes. The bottle was then sealed and placed in a rotating and heated water bath (available under the trade designation Launder-O-meter from Atlas, Inc. (Athens, Ga.)) at 70° C. for 20 hours. Based on GPC analysis, the carboxyl-terminated poly(methyl methacrylate) polymer had a weight average molecular weight (Mw) of 15,000 grams/mole and the conversion of methyl methacrylate monomer was approximately 99 percent.

An aziridinyl-terminated poly(methyl methacrylate) polymer was prepared by adding 600 grams of a 5 weight percent solution of 1,1'-isophthalaylbis(2-methylaziridine) in toluene to the bottle containing the carboxyl-terminated poly(methyl methacrylate) and mixing for 24 hours at room temperature. The resulting solution was slowly added to 6 fold (by volume) excess of cold methanol, and the precipitated aziridinyl-terminated poly(methyl methacrylate) polymer was filtered, collected, and dried under vacuum. Based on GPC analysis, the weight average molecular weight of the polymer was approximately 15,500 grams/mole with a polydispersity index of 1.3.

Preparatory Examples P3-P5

Preparation of Viscoelastic Materials

Curable compositions were prepared by mixing the amounts of isooctyl acrylate (IOA) and acrylic acid (AA) shown in Table 1 with 0.004 grams isooctylthioglycolate (IOTG) and 0.02 grams 2-dimethoxy-2-phenylacetophenone (commercially available under the trade designation IRGA-CURE 651 from Ciba Specialty Chemicals (Tarrytown, N.Y.)) in an amber bottle. Pouches were prepared by heat sealing 0.065 mm thick clear poly(ethylene vinyl acetate) film to form open ended pouches measuring 18 cm by 5 cm pouch and weighing about 1.4 grams each. The poly(ethylene vinyl acetate) film was obtained under the trade designation VA-24 from Flint Hills Resources (Wichita, Kans.). Each pouch was filled with approximately 26 grams of the curable composition. Air was forced out of the open end of the pouches and then the open ends were sealed. Pouches were sealed using a Midwest Pacific Impulse Sealer (J.J. Elemer Corp. St. Louis, Mo.). The sealed pouches were immersed in a constant temperature water bath at 17° C. and irradiated with ultraviolet light (365 nm, 4 mW/cm$^2$) for eight minutes on each side to polymerize the curable compositions. The resulting products were viscoelastic materials. The molecular weight of the polymer was determined by dissolving each polymer in tetrahydrofuran and analyzing by GPC.

TABLE 1

Composition of Viscoelastic Materials

| Example | IOA (Grams/Wt %) | AA (Grams/Wt %) | Approx. MW (Grams/mole) |
|---|---|---|---|
| P3 | 24.4/94 | 1.6/6 | 1,050,000 |
| P4 | 25.0/96 | 1.0/4 | 1,000,000 |
| P5 | 25.5/98 | 0.5/2 | 900,000 |

Examples 1-21

Preparation of Grafted Copolymer and Polyamide Blends

Pouches of the viscoelastic materials from Preparatory Examples P3 to P5 were melted using a high temperature compounder commercially available under the trade designation BRABENDER (Half Size Mixer) from C.W. Brabender (Hackensack, N.J.). For each example, the pouches of the viscoelastic materials were mixed for 5 minutes at 100 revolutions per minute (rpm) with the temperature set at 150° C. When the viscoelastic material within each pouch appeared uniformly melted, the aziridinyl-terminated polymer from Preparatory Example P1 or P2 and a polyamide were added and allowed to mix at 100 rpm for 10 minutes at 150° C. For polyamide samples 6(3)T and N12 the mixing temperature was increased to 175 C. The mixing chamber was then cooled to 100° C. and the rotation of the mixing paddles was reversed to expel and collect resulting material. The particular viscoelastic material, aziridinyl-terminated polymer, and polyamide used in each example is identified in Table 2 below.

As used herein, the term "P1205" refers to a polyamide that is commercially available under the trade designation PEBAX 1205 from Arkema, Inc. (Colombes, France). This material is a polyether-based polyamide with a melting temperature of 147° C.

The term "P2533" refers to a polyamide that is commercially available under the trade designation PEBAX 2533 from Arkema, Inc. (Colombes, France). This material is a polyether-based polyamide with a melting temperature of 134° C.

The term "P6333" refers to a polyamide that is commercially available under the trade designation PEBAX 6333 from Arkema, Inc. (Colombes, France). This material is a polyether-based polyamide with a melting temperature of 169° C.

The term "M6240" refers to a polyamide that is commercially available under the trade designation MACROMELT 6240 from Henkel (Dusseldorf, Germany). This material is a dimer acid-based polyamide with a melting temperature of 141° C.

The term "N6(3)T" refers to a nylon that is commercially available under the trade designation NYLON 6(3)T from Scientific Polymer Products Inc (Ontario, N.Y.). This material is a block copolymer of terephthalic acid and an alkylene diamine. This material has a melting temperature of 250° C.

The term "N12" refers to a poly(lauryl lactam) based polyamide that is commercially available under the trade designation NYLON 12 from Scientific Polymer Products Inc. (Ontario, N.Y.). This material has a melting/softening temperature of 178° C.

After cooling, approximately 1 gram of the blended composition was placed between a primed polyester liner (HOSTAPHEN 3SAB PET film, obtained from Mitsubishi (Greer, S.C.)) and a silicone treated release liner (Silphan S36 liner, obtained from Siliconature SPA (Godega di Sant'Urbano, Italy)). This construction was placed between the plates of a heated press from Carver, Inc. (Wabash, Ind.) with plate temperatures set at 80° C. and compressed to a thickness of approximately 0.05 millimeters (mm). After cooling, test strips were prepared and tested for peel adhesion and shear strength according to the Test Methods. Results are shown in Table 2.

TABLE 2

Blended Compositions of Grafted Copolymer and Polyamide

| Ex | Viscoelastic Material/ Grams | Aziridinyl-terminated Polymer/Grams | Polyamide Polymer/Grams | Shear Strength (Minutes) | Peel Force (N/dm) |
|---|---|---|---|---|---|
| 1 | P3/25 | P1/1.8 | P1205/1 | +10,000 | 10 |
| 2 | P4/25 | P1/1.8 | P1205/1 | +10,000 | 15 |
| 3 | P5/25 | P1/1.25 | P1205/1 | 2,900 | 18 |
| 4 | P4/25 | P1/1.8 | P2533/1 | 1,580 | 14 |
| 5 | P4/25 | P1/1.8 | P6333/1 | 630 | 12 |
| 6 | P3/25 | P1/1.25 | P1205/0.75 | 1,940 | 34 |
| 7 | P3/24 | P1/1.25 | P1205/0.48 | 1,950 | 36 |
| 8 | P3/24 | P1/1.25 | P1205/0.24 | 1,950 | 37 |
| 9 | P3/25 | P1/2.5 | P1205/2 | +10,000 | 8 |
| 10 | P4/25 | P1/2.5 | P1205/2 | +10,000 | 5 |
| 11 | P5/25 | P1/2.5 | P1205/2 | +10,000 | 3 |
| 12 | P3/24 | P1/0.9 | P1205/0.96 | 2,560 | 12 |
| 13 | P3/24 | P1/0.6 | P1205/0.96 | 1,330 | 38 |
| 14 | P3/24 | P1/0.3 | P1205/0.96 | 860 | 46 |
| 15 | P3/25 | P2/2.5 | P1205/2 | 3,000 | 23 |
| 16 | P3/25 | P2/1.8 | M6240/2 | +10,000 | 14 |
| 17 | P3/25 | P1/1.8 | N6(3)T/1 | 4,720 | 12 |
| 18 | P3/25 | P1/1.8 | M6240/1 | +10,000 | 13 |
| 19 | P3/25 | P1/1.8 | M6240/2 | +10,000 | 9 |
| 20 | P4/25 | P1/1.8 | M6240/2 | +10,000 | 10 |
| 21 | P3/25 | P1/1.8 | N12/1 | +10,000 | 13 |

Example 22

Preparation of Grafted Copolymer, Polyamide, and Tackifier Blends

A blended composition was prepared using 21 grams of viscoelastic material P3, 0.84 grams of polyamide P1205, 1 gram of aziridinyl-terminated polymer P1, and 3 grams of tackifier (a partially hydrogenated hydrocarbon resin sold under the trade designation REGALREZ 6108 by Eastman Co. (Kinsgport Tenn.)). Viscoelastic material P3 within a pouch was mixed in the compounder from C.W. Brabender (Hackensack, N.J.) for 5 minutes at 100 rpm with the temperature set at 150° C. until the pouch material and the viscoelastic material appeared uniformly melted. Then the tackifier was added and mixed for 5 minutes under the same conditions. Then the aziridinyl-terminated polymer P1 and the polyamide P1205 were added and mixed at 100 rpm for 10 minutes at 150° C.

Test strips of the blended composition were prepared and evaluated as described for Examples 1 to 21. The shear strength was 1,980 minutes and the peel force was 43 N/dm.

Comparative Examples C1-C15

Test strips were prepared and evaluated from the compositions shown in Table 3 using the preparation and evaluation procedures described for Example 1 to 20. The test results are shown in Table 3. No polyamide was included in Comparative Examples C1 to C10 and no aziridinyl-terminated polymer was included in Comparative Examples C11 to C15.

TABLE 3

Comparative Examples

| Ex | Viscoelastic Material/ Grams | Aziridinyl-terminated Polymer/Grams | Polyamide Polymer/ Grams | Shear Strength (Minutes) | Peel Force (N/dm) |
|---|---|---|---|---|---|
| C1 | P3/26 | None | None | 120 | 53 |
| C2 | P4/26 | None | None | 50 | 64 |

TABLE 3-continued

Comparative Examples

| Ex | Viscoelastic Material/ Grams | Aziridinyl-terminated Polymer/Grams | Polyamide Polymer/ Grams | Shear Strength (Minutes) | Peel Force (N/dm) |
|---|---|---|---|---|---|
| C3 | P5/26 | None | None | 5 | 74 |
| C4 | P3/26 | P1/2.6 | None | 4,280 | 38 |
| C5 | P3/26 | P1/1.8 | None | 2,880 | NT |
| C6 | P3/26 | P1/1.4 | None | 1,976 | 29 |
| C7 | P3/26 | P1/1 | None | 491 | 11 |
| C8 | P3/26 | P2/2.6 | None | 210 | 30 |
| C9 | P4/26 | P1/2.6 | None | 860 | NT |
| C10 | P5/26 | P1/2.6 | None | 70 | 41 |
| C11 | P3/25 | None | P1205/1 | 280 | 53 |
| C12 | P3/25 | None | P1205/2 | 620 | 49 |
| C13 | P5/25 | None | P1205/2 | 20 | 59 |
| C14 | P3/25 | None | N6(3)T/1 | 170 | 62 |
| C15 | P3/25 | None | M6240/1 | 870 | 36 |

What is claimed is:

1. A composition comprising:
a) a grafted copolymer comprising a product of a reaction mixture comprising
1) a first compound of Formula (I)

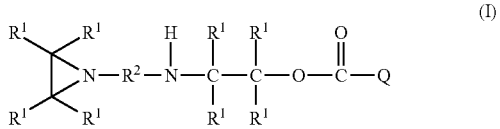

wherein
each $R^1$ is independently hydrogen or an alkyl;
$R^2$ is a divalent group comprising an alkylene, heteroalkylene, arylene, heteroarylene, or a combination thereof and optionally further comprising an oxy, carbonyl, carbonyloxy, carbonylimino, —$NR^3$—, or a combination thereof;
$R^3$ is hydrogen or an alkyl; and
Q is a first polymeric group comprising a polymerized product of a first monomer composition comprising at least one ethylenically unsaturated monomer; and
2) a second polymeric material having at least one acidic group; and
b) a polyamide blended with the grafted copolymer, wherein the polyamide is selected 1) to have a melting temperature no greater than 200° C., 2) to be at least partially soluble in the composition at blending temperature, or 3) both 1) and 2).

2. The composition of claim 1, wherein the composition is an adhesive.

3. The composition of claim 1, wherein the composition is a pressure-sensitive adhesive.

4. The composition of claim 1, wherein the composition is hot melt processable.

5. The composition of claim 1, wherein the polyamide is present in an amount in a range of 0.5 to 20 weight percent based on a total weight of the composition.

6. The composition of claim 1, wherein the polyamide is a block copolymer having at least one polyether segment.

7. The composition of claim 1, wherein the polyamide is a block copolymer having (a) at least one polyether segment and (b) at least one alkylene segment.

8. The composition of claim 1, wherein the polyamide has a plurality of alkylene or heteroalkylene segments.

9. The composition of claim 1, wherein the polyamide is a block copolymer having (a) at least one alkylene or heteroalkylene segment and (b) at least one arylene segment.

10. The composition of claim 1, wherein the polyamide is a product of a reaction mixture comprising (a) an alkylene diamine, heteroalkylene diaminer, or a combination thereof and (b) a dimer acid.

11. The composition of claim 1, wherein the second polymeric material is a polymerized product of a second monomer composition comprising (a) (meth)acrylic acid and (b) at least one (meth)acrylate ester.

12. The composition of claim 1, wherein group Q is phase separated from the second polymeric material in the grafted copolymer.

13. The composition of claim 1, wherein the at least one ethylenically unsaturated monomer used to form Q is selected to have a glass transition temperature equal to at least 20° C. when polymerized as a homopolymer.

14. The composition of claim 1, wherein Q is has a weight average molecular weight greater than 5000 grams/mole.

15. The composition of claim 1, wherein the first monomer composition comprises styrene, alpha-methyl styrene, or an alkyl substituted styrene.

16. The composition of claim 1, wherein the first monomer composition comprises a (meth)acrylate ester, (meth)acrylamide, or a combination thereof.

17. The composition of claim 1, wherein the group Q is a random copolymer and the first monomer composition comprises a vinyl aryl monomer and a vinyl heterocyclic monomer.

18. The composition of claim 1, wherein the group Q is a block copolymer and the first monomer composition comprises a first block of poly(vinyl aryl monomer) and a second block of poly(vinyl heterocyclic monomer).

19. The composition of claim 1, wherein the composition further comprises a tackifier.

20. A method of making a composition, the method comprising
providing a grafted copolymer comprising a product of a reaction mixture comprising
1) a first compound of Formula (I)

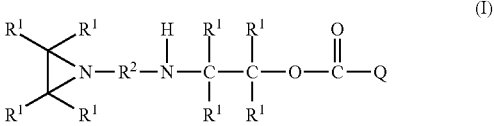

wherein
each $R^1$ is independently hydrogen or an alkyl;
$R^2$ is a divalent group comprising an alkylene, heteroalkylene, arylene, heteroarylene, or a combination thereof and optionally further comprising an oxy, carbonyl, carbonyloxy, carbonylimino, —$NR^3$—, or a combination thereof;
$R^3$ is hydrogen or an alkyl; and
Q is a first polymeric group comprising a polymerized product of a first monomer composition comprising at least one ethylenically unsaturated monomer; and
2) a second polymeric material having at least one acidic group; and
blending the grafted copolymer with a polyamide, wherein the polyamide is selected 1) to have a melting temperature no greater than 200° C., 2) to be at least partially soluble in the composition at blending temperature, or 3) both 1) and 2).

* * * * *

UNITED STATES PATENT AND TRADEMARK OFFICE
CERTIFICATE OF CORRECTION

PATENT NO.          : 8,975,342 B2
APPLICATION NO.     : 13/885083
DATED               : March 10, 2015
INVENTOR(S)         : Jason Clapper It is certified that error appears in the above-identified patent and that said Letters Patent is hereby corrected as shown below:

Title Page, Column 2 (Other Publications)
Line 16, delete "lzvestiya" and insert -- Izvestiya --, therefor.

In the Specification

Column 3
Line 65 (Approx.), delete "ayrl" and insert -- aryl --, therefor.

Column 4
Line 16, delete "bicylic," and insert -- bicyclic, --, therefor.

Column 5
Line 42, delete "azirdinyl" and insert -- aziridinyl --, therefor.

Line 45, delete "azridinyl" and insert -- aziridinyl --, therefor.

Column 12
Line 53, delete "then" and insert -- than --, therefor.

Line 55, delete "then" and insert -- than --, therefor.

Column 13
Line 12, delete "sytrenes" and insert -- styrenes --, therefor.

Lines 12-13, delete "dimethylstytrene," and insert -- dimethylstyrene, --, therefor.

Line 20, delete "proprionate." and insert -- propionate. --, therefor.

Signed and Sealed this
Eighteenth Day of August, 2015

Michelle K. Lee
*Director of the United States Patent and Trademark Office*

Column 18
Line 29, delete "tridencanol," and insert -- tridecanol, --, therefor.

Line 58, delete "then" and insert -- than --, therefor.

Column 19
Line 17, delete "photoinitator," and insert -- photoinitiator, --, therefor.

Line 18, delete "photoinitator" and insert -- photoinitiator --, therefor.

Line 44, delete "naphthanate)." and insert -- naphthenate). --, therefor.

Column 20
Line 32, delete "then" and insert -- than --, therefor.

Line 45, delete "iconomeric" and insert -- ionomeric --, therefor.

Column 23
Line 6, delete "dimethylstytrene," and insert -- dimethylstyrene, --, therefor.

Line 8, delete "proprionate," and insert -- propionate, --, therefor.

Column 24
Lines 31-42, delete "The viscoelastic material is prepared and then mixed... viscoelastic material, melt the packaging material, or both." and insert the same on Col. 24, Line 32, as a new Paragraph.

Column 29
Lines 41-42, delete "polyfluorpolyether" and insert -- polyfluoropolyether --, therefor.

Column 31
Line 19, after "Q" delete "is".

Column 33
Line 44 (Approx.), delete "isophthalaylbis" and insert -- isophthaloylbis --, therefor.

Column 34
Line 17, delete "isophthalaylbis" and insert -- isophthaloylbis --, therefor.

Column 35
Line 47, delete "Inc" and insert -- Inc. --, therefor.

Column 36
Line 37, delete "(Kinsgport" and insert -- (Kingsport --, therefor.

CERTIFICATE OF CORRECTION (continued)
U.S. Pat. No. 8,975,342 B2

In the Claims

Column 38
Line 20, in Claim 14, after "Q" delete "is".